US012568012B2

(12) United States Patent
Krips et al.

(10) Patent No.: US 12,568,012 B2
(45) Date of Patent: Mar. 3, 2026

(54) TECHNIQUES FOR TONE RESERVATION IN ORTHOGONAL TIME-FREQUENCY SPACE WAVEFORM COMMUNICATIONS

(71) Applicant: QUALCOMM Incorporated, San Diego, CA (US)

(72) Inventors: Ram Krips, Ramat Gan (IL); Gideon Shlomo Kutz, Ramat Hasharon (IL); Elad Meir, Ramat Gan (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 18/185,847

(22) Filed: Mar. 17, 2023

(65) Prior Publication Data

US 2024/0314013 A1     Sep. 19, 2024

(51) Int. Cl.
*H04L 27/26* (2006.01)
*H04W 28/26* (2009.01)

(52) U.S. Cl.
CPC ...... *H04L 27/2639* (2013.01); *H04L 27/2614* (2013.01); *H04L 27/2686* (2013.01); *H04W 28/26* (2013.01)

(58) Field of Classification Search
CPC ............. H04L 27/2614; H04L 27/2618; H04L 27/2639; H04L 27/2686; H04W 28/26
See application file for complete search history.

(56) References Cited

U.S. PATENT DOCUMENTS

| | | | | |
|---|---|---|---|---|
| 11,502,798 B1 * | 11/2022 | Horn | ................... | H04W 72/542 |
| 2013/0343482 A1 * | 12/2013 | Jiang | ................... | H04L 27/2618 |
| | | | | 375/296 |
| 2017/0033899 A1 * | 2/2017 | Rakib | ................. | H04L 27/2655 |
| 2018/0205481 A1 * | 7/2018 | Shlomo | .............. | H04L 27/2639 |
| 2018/0278452 A1 * | 9/2018 | Yang | ...................... | H04L 5/001 |
| 2021/0105155 A1 * | 4/2021 | Kons | ................... | H04L 25/0248 |
| 2021/0111786 A1 * | 4/2021 | Pfadler | ................ | H04B 17/345 |

(Continued)

OTHER PUBLICATIONS

"OTFS: A New Generation of Modulation Addressing the Challenges of 5G"; Hadani et al.; Aug. 2017 (Year: 2017).*

(Continued)

*Primary Examiner* — Benjamin H Elliott, IV
(74) *Attorney, Agent, or Firm* — Holland & Hart LLP/Qualcomm

(57) ABSTRACT

Methods, systems, and devices for wireless communications are described that provide for application of a tone reservation signal for orthogonal time-frequency space (OTFS) waveform communications. A tone reservation signal may use a first subset of resources of a set of resources associated with an OTFS frame, which may mitigate relatively large PAPR associated with transmission of the OTFS frame. A tone reservation signal may use in-frame resources (e.g., as delay-Doppler locations within a delay-Doppler resource grid) of the OTFS frame, or may use tone reservation resources may correspond subcarriers that are out-of-band with subcarriers of an OTFS frame. Signaling may be provided by a transmitting device that indicates the tone reservation resources, and a receiving device may decode a received communication in accordance with remaining resources other than the tone reservation resources.

30 Claims, 23 Drawing Sheets

(56) References Cited

U.S. PATENT DOCUMENTS

| | | | | |
|---|---|---|---|---|
| 2021/0281456 A1* | 9/2021 | Yunusov | ............. | H04L 27/2637 |
| 2022/0070039 A1* | 3/2022 | Ly | ........................ | H04L 27/2607 |
| 2023/0120730 A1* | 4/2023 | Horn | ................... | H04L 27/2618 |
| | | | | 370/329 |
| 2024/0267276 A1* | 8/2024 | Kons | ................... | H04L 27/2697 |
| 2024/0314013 A1* | 9/2024 | Krips | ................. | H04L 27/2686 |

OTHER PUBLICATIONS

"A Novel PAPR Reduction Method Based on Grid Reservation in Delay-Doppler Domain for OTFS Systems"; Liu et al.; 2024 IEEE 100th Vehicular Technology Conference (VTC2024-Fall) (Year: 2024).*

OTFS—A Mathematical Foundation for Communication and Radar Sensing in the Delay-Doppler Domain; Mohammed et al.; IEEE BITS The Information Theory Magazine; Nov. 2023 (Year: 2023).*

Gao S., et al., "Peak-to-Average Power Ratio Reduction in Pilot-Embedded OTFS Modulation Through Iterative Clipping and Filtering", IEEE Communications Letters, IEEE Service Center, Piscataway, Nj, US, vol. 24, No. 9, May 6, 2020, pp. 2055-2059, XP011807671, p. 2056.

Hu S., et al., "Nonlinearity Reduction by Tone Reservation with Null Subcarriers for WiMAX System", Wireless Personal Communications, Kluwer Academic Publishers, DO, vol. 54, No. 2, Apr. 28, 2009, pp. 289-305, XP019832925, paragraph [03.1].

International Search Report and Written Opinion - PCT/US2024/016945 - ISA/EPO - 2024-06-18 (2301421WO).

Shang H., et al., "OTFS Modulation and PAPR Reduction for loT-Railways", China Communications, China Institute of Communications, Piscataway, Nj, USA, vol. 20, No. 1, Jan. 1, 2023, pp. 102-113, XP011934123, p. 103, right-hand col. paragraph 2 figure 1.

Tellado-Mourelo J., "Peak to Average Power Reduction for Multicarrier Modulation", Dissertation Submitted to the Department of Electricalengineering and the Committee on Graduate Studies of Stanforduniversity in Partial Fulfillment of the Requirements for Thedegree of Doctor of Philosophy, Xx, Xx, Sep. 1, 1999, 169 p. XP002463333, p. 66 - p. 99.

* cited by examiner

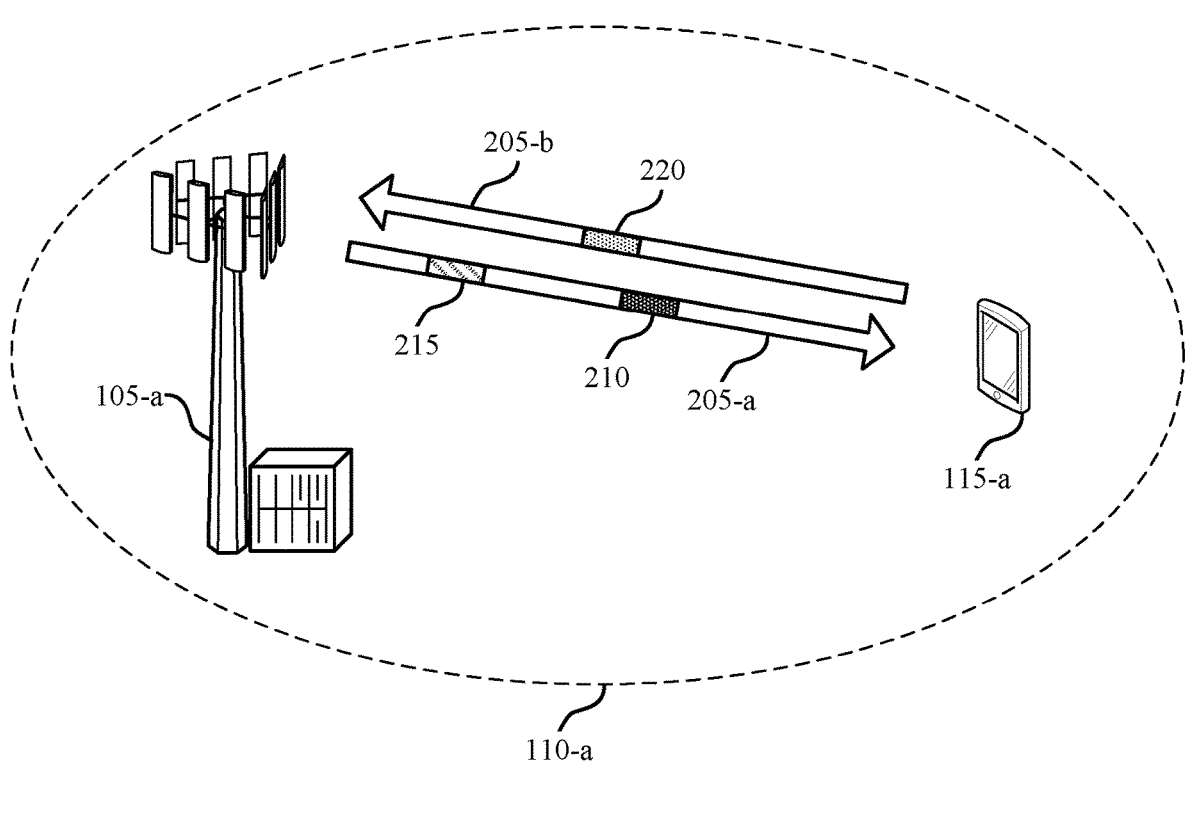
205-b
220
215
210    205-a
105-a
115-a
110-a
 Configuration Message 210
Signal 215
Signal 220
200
FIG. 2

605

615    620

IDFT
$L$

Delay ($M$)

$M \times L$
$Q$-QAM
$ML\log_2 Q$ bits

IDFT
$L$

615

Delay

Time
($L$ symbols)

610

2D-DFT
($M \times L$)

625

DFT
$M$    • • •    DFT
$M$

625

Doppler ($L$)

655

Out-Of-Frame Tone Reservation
In The Frequency Domain

Frequency

OTFS
Frame

Symbols

Alternative
1

665

Frequency

OTFS
Frame 1

OTFS
Frame 2

Symbols

Alternative
n

670

Tone Reservation Resources

660

635

630

OFDM Waveform Processing

Frequency
($M$ subcarriers)

Time
($L$ symbols)

640

640

IFFT
$N$    • • •    IFFT
$N$

645

650

P/S + CP

Time
Domain
Signal

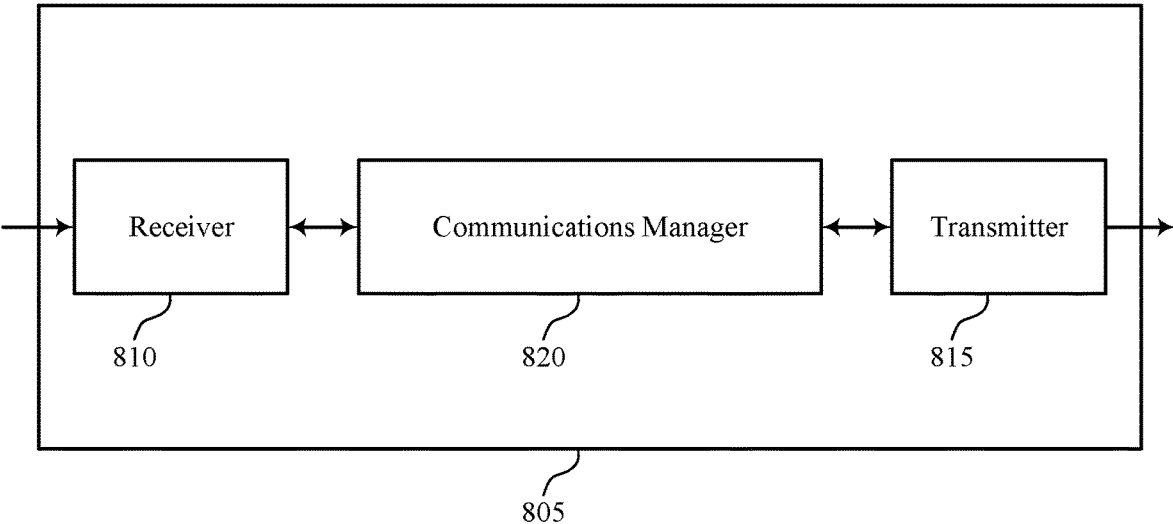
810         820         815
805
800
FIG. 8

130

105

115

Network
Entity

Transceiver

1210

Antenna

1215

Communications
Manager

1220

Memory

Code

1230

1225

1240

Processor

1235

1205

1200

130          105                          115

Network
Entity

Transceiver                    Antenna 1610                           1615

Memory

Code

1630

Communications
Manager                        1625

1620

1640

Processor

1635

1605

1600

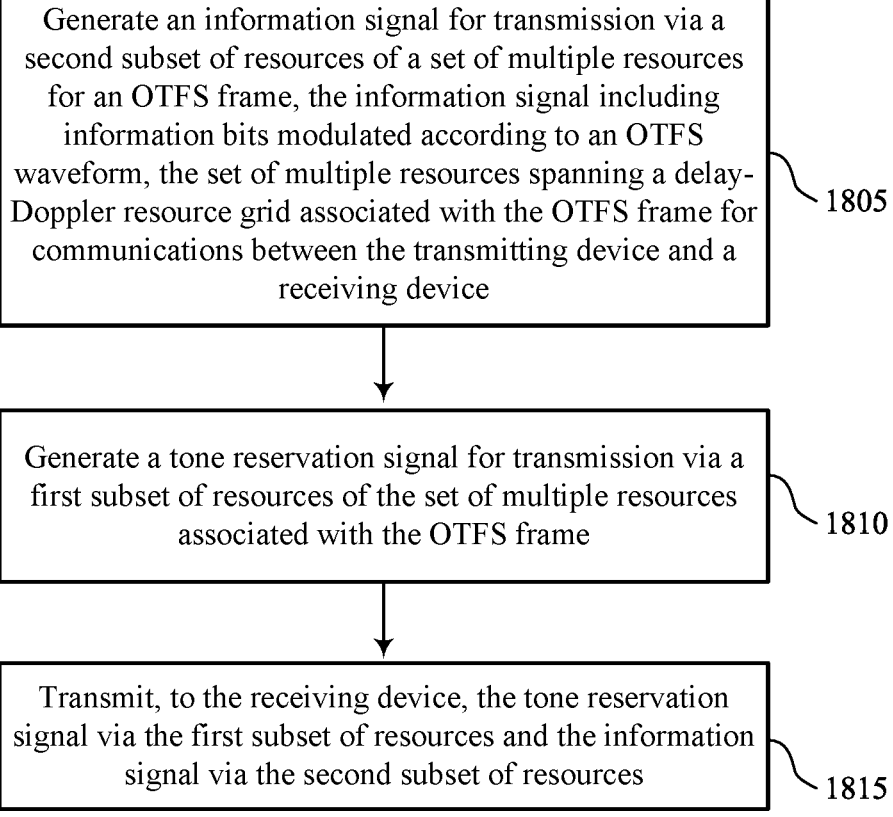

Generate an information signal for transmission via a second subset of resources of a set of multiple resources for an OTFS frame, the information signal including information bits modulated according to an OTFS waveform, the set of multiple resources spanning a delay-Doppler resource grid associated with the OTFS frame for communications between the transmitting device and a receiving device

1805

Generate a tone reservation signal for transmission via a first subset of resources of the set of multiple resources associated with the OTFS frame

1810

Transmit, to the receiving device, the tone reservation signal via the first subset of resources and the information signal via the second subset of resources

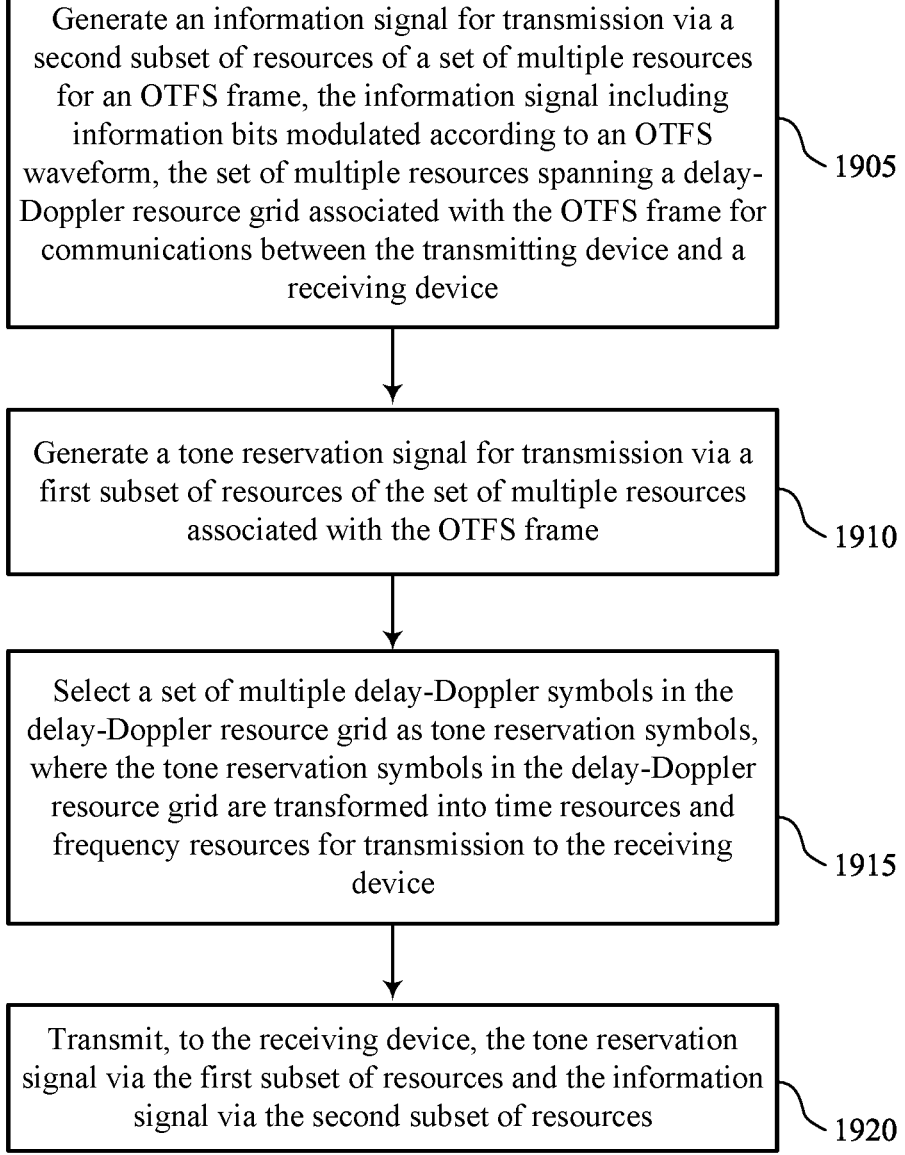

Generate an information signal for transmission via a second subset of resources of a set of multiple resources for an OTFS frame, the information signal including information bits modulated according to an OTFS waveform, the set of multiple resources spanning a delay-Doppler resource grid associated with the OTFS frame for communications between the transmitting device and a receiving device

1905

Generate a tone reservation signal for transmission via a first subset of resources of the set of multiple resources associated with the OTFS frame

1910

Select a set of multiple delay-Doppler symbols in the delay-Doppler resource grid as tone reservation symbols, where the tone reservation symbols in the delay-Doppler resource grid are transformed into time resources and frequency resources for transmission to the receiving device

1915

Transmit, to the receiving device, the tone reservation signal via the first subset of resources and the information signal via the second subset of resources

Figure 21:
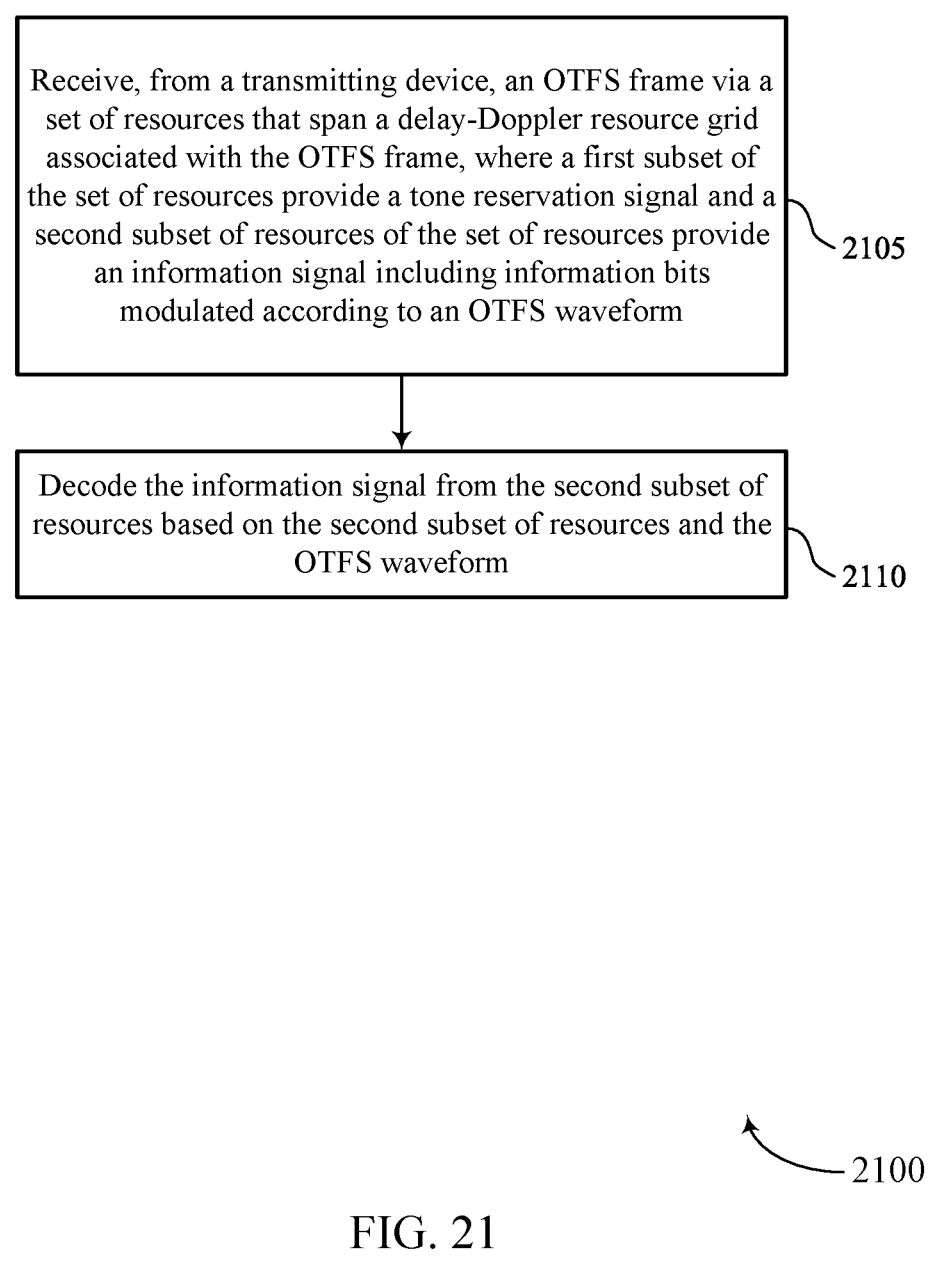

Receive, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform

2105

Decode the information signal from the second subset of resources based on the second subset of resources and the OTFS waveform

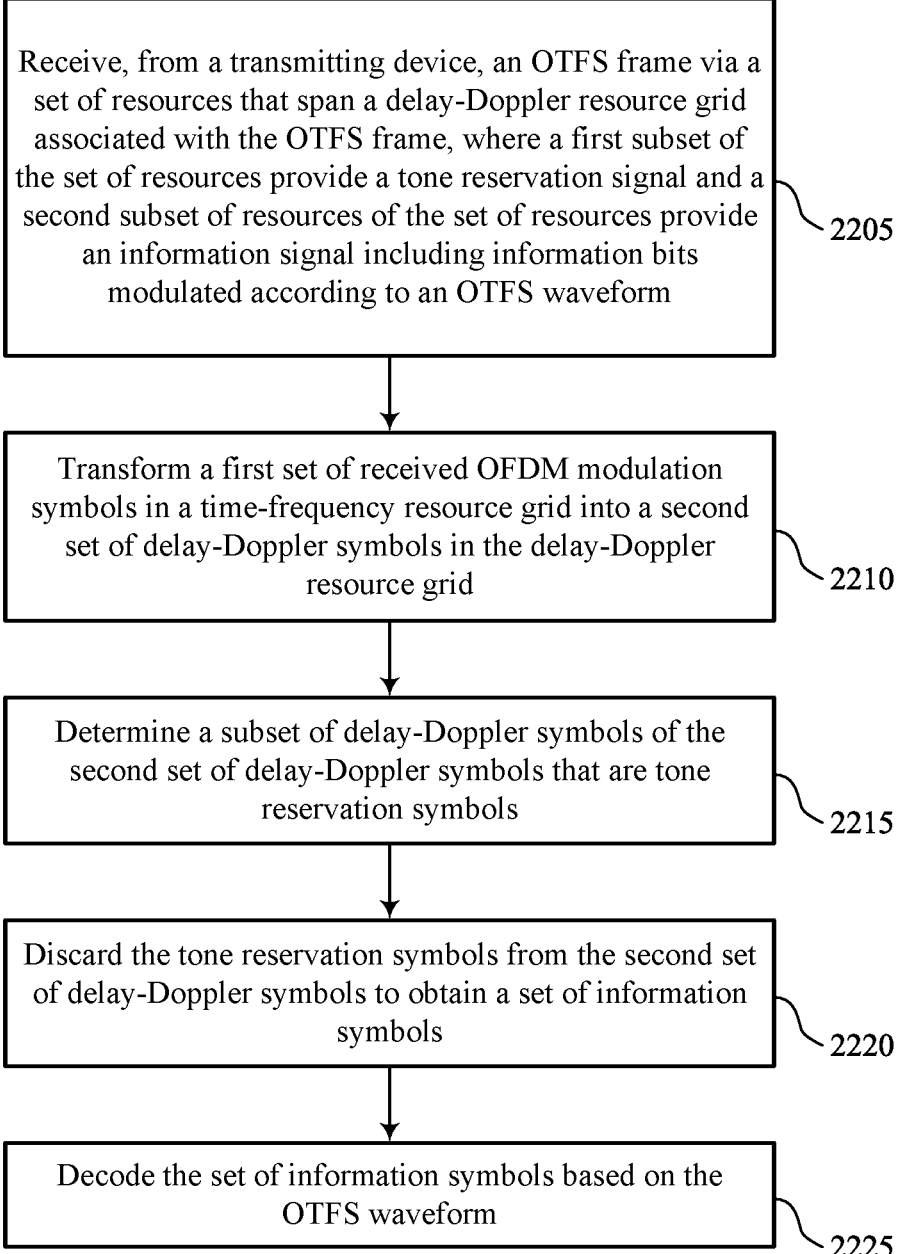

Receive, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform

2205

Transform a first set of received OFDM modulation symbols in a time-frequency resource grid into a second set of delay-Doppler symbols in the delay-Doppler resource grid

2210

Determine a subset of delay-Doppler symbols of the second set of delay-Doppler symbols that are tone reservation symbols

2215

Discard the tone reservation symbols from the second set of delay-Doppler symbols to obtain a set of information symbols

2220

Decode the set of information symbols based on the OTFS waveform

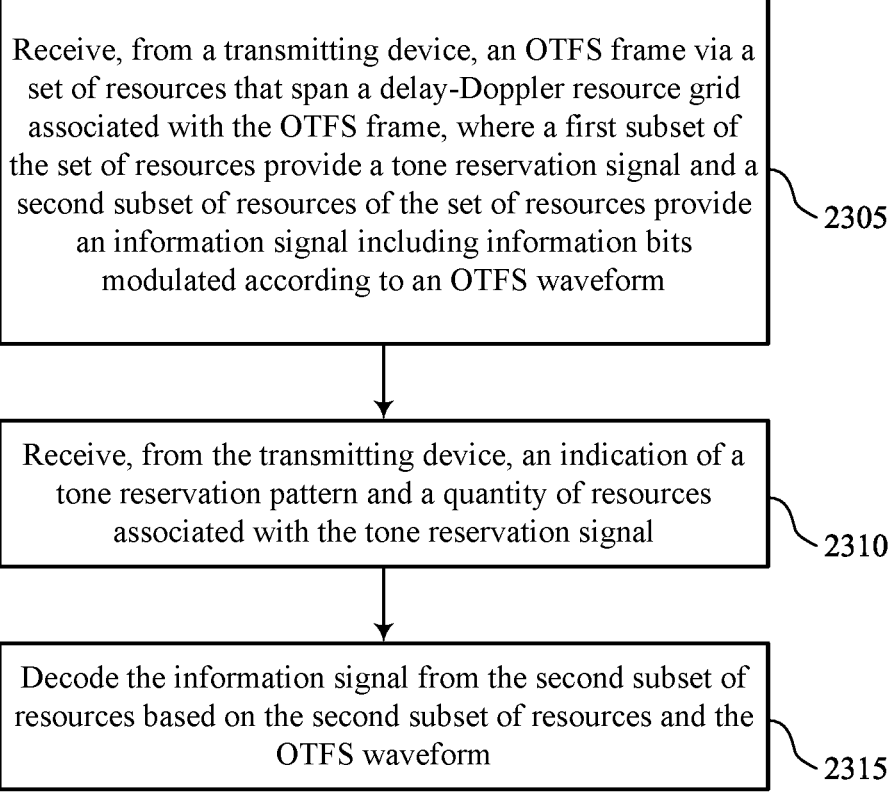

Receive, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform

⎰ 2305

Receive, from the transmitting device, an indication of a tone reservation pattern and a quantity of resources associated with the tone reservation signal

⎰ 2310

Decode the information signal from the second subset of resources based on the second subset of resources and the OTFS waveform

TECHNIQUES FOR TONE RESERVATION IN ORTHOGONAL TIME-FREQUENCY SPACE WAVEFORM COMMUNICATIONS

FIELD OF TECHNOLOGY

The following relates to wireless communications, including tone reservation techniques for orthogonal time-frequency space waveform communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support tone reservation techniques for orthogonal time-frequency space (OTFS) waveform communications. For example, the described techniques provide for application of a tone reservation signal for OTFS waveform communications, which may reduce a peak-to-average power ratio (PAPR) of a communication containing the OTFS frame and enhance communications efficiency. In accordance with various aspects, a tone reservation signal may use a first subset of resources of a set of resources associated with an OTFS frame, which may mitigate relatively large PAPR associated with transmission of the OTFS frame. In some cases, tone reservation may use in-frame resources (e.g., as delay-Doppler locations within a delay-Doppler resource grid) of the OTFS frame. In some cases, one Doppler location may be selected for each available delay location of the delay-Doppler resource grid. In other cases, a different Doppler location may be selected for one or more different delay locations of the delay-Doppler resource grid. In other aspects, tone reservation resources may correspond subcarriers that are out-of-band with subcarriers of an OTFS frame. For example, tone reservation subcarriers may be above and/or below resources of an OTFS frame in the frequency domain. Additionally or alternatively, tone reservation subcarriers may be provided between two or more different sets of OTFS frame resources.

A method for wireless communication at a transmitting device is described. The method may include generating a tone reservation signal for transmission via a first subset of resources of a set of multiple resources associated with an orthogonal time-frequency space (OTFS) frame, the set of multiple resources spanning a delay-Doppler resource grid associated with the OTFS frame for communications between the transmitting device and a receiving device, generating an information signal for transmission via a second subset of resources of the set of multiple resources for the OTFS frame, the information signal including information bits modulated according to an OTFS waveform, and transmitting, to the receiving device, the tone reservation signal via the first subset of resources and the information signal via the second subset of resources.

An apparatus for wireless communication at a transmitting device is described. The apparatus may include a processor, memory coupled with the processor, and instructions stored in the memory. The instructions may be executable by the processor to cause the apparatus to generate a tone reservation signal for transmission via a first subset of resources of a set of multiple resources associated with an OTFS frame, the set of multiple resources spanning a delay-Doppler resource grid associated with the OTFS frame for communications between the transmitting device and a receiving device, generate an information signal for transmission via a second subset of resources of the set of multiple resources for the OTFS frame, the information signal including information bits modulated according to an OTFS waveform, and transmit, to the receiving device, the tone reservation signal via the first subset of resources and the information signal via the second subset of resources.

Another apparatus for wireless communication at a transmitting device is described. The apparatus may include means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device, means for generating an information signal for transmission via a second subset of resources of the set of multiple resources for the OTFS frame, the information signal including information bits modulated according to an OTFS waveform, and means for transmitting, to the receiving device, the tone reservation signal via the first subset of resources and the information signal via the second subset of resources.

A non-transitory computer-readable medium storing code for wireless communication at a transmitting device is described. The code may include instructions executable by a processor to generate a tone reservation signal for transmission via a first subset of resources of a set of multiple resources associated with an OTFS frame, the set of multiple resources spanning a delay-Doppler resource grid associated with the OTFS frame for communications between the transmitting device and a receiving device, generate an information signal for transmission via a second subset of resources of the set of multiple resources for the OTFS frame, the information signal including information bits modulated according to an OTFS waveform, and transmit, to the receiving device, the tone reservation signal via the first subset of resources and the information signal via the second subset of resources.

In some examples of the method, apparatuses, and non-transitory computer-readable medium described herein, integration of the tone reservation signal via the first subset of resources provides a reduced peak to average power ratio (PAPR) relative to a PAPR of the information signal using the OTFS frame that occupies all resources of the set of multiple resources. In some examples of the method, apparatuses, and non-transitory computer-readable medium described herein, the first subset of resources include a first subset of delay-Doppler symbols in the delay-Doppler resource grid.

In some examples of the method, apparatuses, and non-transitory computer-readable medium described herein, the generating the tone reservation signal may include operations, features, means, or instructions for selecting a set of multiple delay-Doppler symbols in the delay-Doppler resource grid as tone reservation symbols, where the tone reservation symbols in the delay-Doppler resource grid are transformed into time resources and frequency resources for transmission to the receiving device. In some examples of the method, apparatuses, and non-transitory computer-readable medium described herein, the tone reservation symbols may be selected as one Doppler location for each delay location of the delay-Doppler resource grid. In some examples of the method, apparatuses, and non-transitory computer-readable medium described herein, the Doppler location of the tone reservation symbols may be a same Doppler location for each delay location of the delay-Doppler resource grid. In some examples of the method, apparatuses, and non-transitory computer-readable medium described herein, the Doppler location of the tone reservation symbols may be a different Doppler location for one or more different delay locations of the delay-Doppler resource grid. In some examples of the method, apparatuses, and non-transitory computer-readable medium described herein, the first subset of resources may be out-of-frame resources that occupy one or more resources outside of the OTFS frame.

In some examples of the method, apparatuses, and non-transitory computer-readable medium described herein, the one or more resources correspond to one or more subcarriers of a set of multiple subcarriers associated with the OTFS frame, the first subset of resources correspond to a first subset of subcarriers, and the second subset of resources correspond to a second subset of subcarriers, and where the first subset of subcarriers are higher frequency subcarriers than the second subset of subcarriers, are lower frequency subcarriers than the second subset of subcarriers, or any combinations thereof. In some examples of the method, apparatuses, and non-transitory computer-readable medium described herein, the second subset of subcarriers may be divided into two or more separate frequency allocations to provide two or more separate OTFS frames, and one or more subcarriers of the first subset of subcarriers are located between the two or more separate frequency allocations.

In some examples of the method, apparatuses, and non-transitory computer-readable medium described herein, the generating the tone reservation signal may include operations, features, means, or instructions for determining a tone reservation pattern and a quantity of resources associated with the tone reservation signal based on one or more channel measurements of a channel between the transmitting device and the receiving device and transmitting an indication of the tone reservation pattern and the quantity of resources associated with the tone reservation signal to the receiving device. In some examples of the method, apparatuses, and non-transitory computer-readable medium described herein, the indication of the tone reservation pattern and the quantity of resources associated with the tone reservation signal may be provided via one or more of a control signaling communication, a radio resource control (RRC) communication, a medium access control (MAC) control element, or any combinations thereof. In some examples of the method, apparatuses, and non-transitory computer-readable medium described herein, the indication of the tone reservation pattern and the quantity of resources associated with the tone reservation signal includes an index value of a set of multiple index values that are mapped to different tone reservation patterns and quantities of resources. In some examples of the method, apparatuses, and non-transitory computer-readable medium described herein, the tone reservation signal includes a guard area to provide for interference mitigation between the tone reservation signal and the information signal.

A method for wireless communication at a receiving device is described. The method may include receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform and decoding the information signal from the second subset of resources based on the second subset of resources and the OTFS waveform.

An apparatus for wireless communication at a receiving device is described. The apparatus may include a processor, memory coupled with the processor, and instructions stored in the memory. The instructions may be executable by the processor to cause the apparatus to receive, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform and decode the information signal from the second subset of resources based on the second subset of resources and the OTFS waveform.

Another apparatus for wireless communication at a receiving device is described. The apparatus may include means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform and means for decoding the information signal from the second subset of resources based on the second subset of resources and the OTFS waveform.

A non-transitory computer-readable medium storing code for wireless communication at a receiving device is described. The code may include instructions executable by a processor to receive, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform and decode the information signal from the second subset of resources based on the second subset of resources and the OTFS waveform.

In some examples of the method, apparatuses, and non-transitory computer-readable medium described herein, the first subset of resources include a first subset of delay-Doppler symbols in the delay-Doppler resource grid. In some examples of the method, apparatuses, and non-transitory computer-readable medium described herein, the decoding the information signal may include operations, features, means, or instructions for transforming a first set of received OFDM modulation symbols in a time-frequency resource grid into a second set of delay-Doppler symbols in the delay-Doppler resource grid, determining a subset of delay-Doppler symbols of the second set of delay-Doppler symbols that may be tone reservation symbols, discarding the tone reservation symbols from the second set of delay-Doppler symbols to obtain a set of information symbols, and decoding the set of information symbols based on the OTFS waveform.

In some examples of the method, apparatuses, and non-transitory computer-readable medium described herein, the tone reservation symbols may be provided as one Doppler location for each delay location of the delay-Doppler resource grid. In some examples of the method, apparatuses, and non-transitory computer-readable medium described herein, the first subset of resources may be out-of-frame resources that occupy one or more resources outside of the OTFS frame.

Some examples of the method, apparatuses, and non-transitory computer-readable medium described herein may further include operations, features, means, or instructions for receiving, from the transmitting device, an indication of a tone reservation pattern and a quantity of resources associated with the tone reservation signal. In some examples of the method, apparatuses, and non-transitory computer-readable medium described herein, the indication of the tone reservation pattern and the quantity of resources associated with the tone reservation signal may be provided via one or more of a control signaling communication, an RRC communication, a MAC control element, or any combinations thereof. In some examples of the method, apparatuses, and non-transitory computer-readable medium described herein, the indication of the tone reservation pattern and the quantity of resources associated with the tone reservation signal includes an index value of a set of multiple index values that are mapped to different tone reservation patterns and quantities of resources.

BRIEF DESCRIPTION OF THE DRAWINGS

FIG. 2 illustrates an example of a wireless communications system that supports tone reservation techniques for OTFS waveform communications in accordance with one or more aspects of the present disclosure.

FIG. 6 illustrates an example of an OTFS transmission scheme with out-of-frame tone reservation that supports tone reservation techniques for OTFS waveform communications in accordance with one or more aspects of the present disclosure.

FIGS. 8 and 9 illustrate block diagrams of devices that support tone reservation techniques for OTFS waveform communications in accordance with one or more aspects of the present disclosure.

FIGS. 18 through 23 illustrate flowcharts showing methods that support tone reservation techniques for OTFS waveform communications in accordance with one or more aspects of the present disclosure.

DETAILED DESCRIPTION

Figure 1:
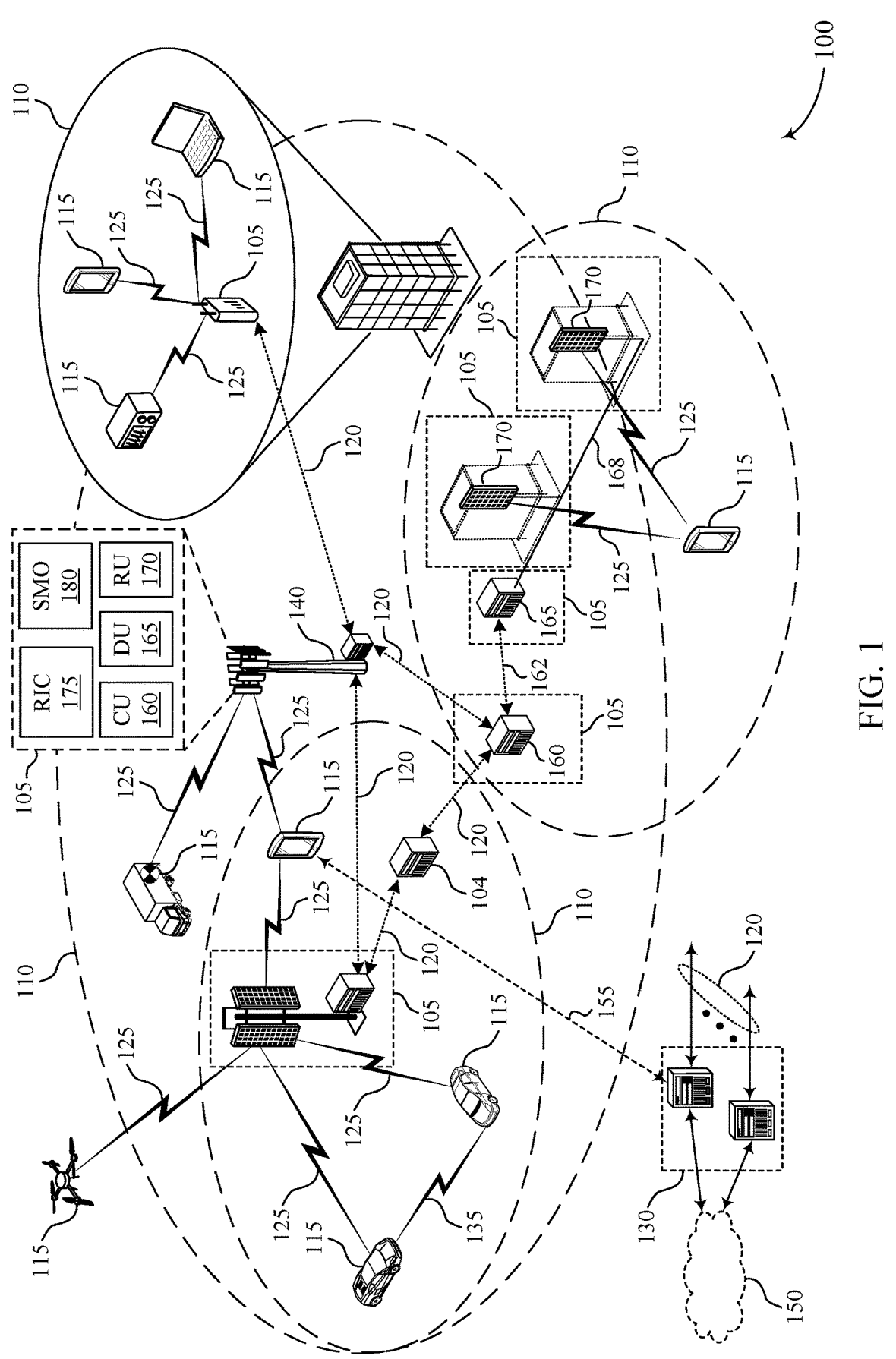
FIG. 1 illustrates an example of a wireless communications system that supports tone reservation techniques for orthogonal time-frequency space (OTFS) waveform communications in accordance with one or more aspects of the present disclosure.

In wireless communication systems, use cases may involve communications between devices that may be moving at relatively high rates of speed with respect to each other (e.g., in V2X communications, high speed trains, etc.). Such high speeds between transmitting and receiving devices may result in high-Doppler channels that present challenges in link adaptation due to channel characteristics becoming outdated relatively quickly. One technique that may help mitigate such link adaptation challenges is an orthogonal time-frequency space (OTFS) waveform. OTFS waveforms may use a delay-Doppler grid in a channel transfer function, where delay correlates to a range of a reflector and Doppler correlates to a speed of the reflector. Using OTFS channel characteristics for such high-Doppler channels may results in a relatively slow-changing channel. However, communications based on OTFS waveforms may have a high peak-to-average power (PAPR) based on the superposition of different signals in subcarriers. High PAPR at a transmitter may, however, trigger a power backoff at a power amplifier, which may reduce total transmit power. Additionally, using the lower transmit power may also affect power amplifier performance and decoding at a receiving device. In accordance with various techniques as discussed herein, mitigation of relatively high PAPRs in OTFS-based communications may be provided.

In accordance with some aspects, techniques are provided for tone reservation in communications that use OTFS frames. In some cases, a tone reservation signal may use a first subset of resources of a set of resources associated with an OTFS frame, to mitigate large PAPR generated by OTFS when carrying information signals. In some cases, tone reservation may use in-frame resources that are within an OTFS frame. Such tone reservation may be incorporated as a tone reservation delay-Doppler location within a delay-Doppler resource grid associated with the OTFS frame. In one example, one Doppler location may be selected for each available delay location of the delay-Doppler resource grid. In another example, a different Doppler location may be selected for one or more different delay locations of the delay-Doppler resource grid. In other cases, tone reservation may be performed in the frequency domain and use subcarriers that are out-of-frame of the OTFS frame. For example, tone reservation subcarriers may be above and/or below OTFS subcarriers in the frequency domain. In some examples, OTFS subcarriers may occupy different allocations, and one or more tone reservation subcarriers may be provided between two or more of the different allocations.

In some cases, when performing tone reservation for OTFS waveform communications, a transmitting device (e.g., a UE, or network entity), may evaluate PAPR for relevant constellations and perform a decision as to tone reservation pattern and percentage, and signal the tone reservation parameters to a receiving device. For example, the transmitting device may indicate tone reservation locations per allocation in control (e.g., downlink control information (DCI)), in radio resource control (RRC) signaling, in a medium access control (MAC) control element (CE), according to specified pre-defined locations, indicated based on an index value of several predefined options, or any combinations thereof. A receiving device may receive the indication that tone reservation is activated, and the number of resources used for the tone reservation and constellation (e.g., via RRC message, DCI or MAC-CE). The receiver may discard the tone reservation tones from the data symbols and perform decoding. Additionally, or alternatively, the receiving device may request for the transmitting device to apply tone reservation, and the receiving device may indicate the one or more tone reservation resources in the request.

Aspects of the disclosure are initially described in the context of wireless communications systems. Aspects of the disclosure are then discussed with reference to a OTFS coding schemes and process diagrams, and a process flow. Aspects of the disclosure are further illustrated by and described with reference to apparatus diagrams, system diagrams, and flowcharts that relate to tone reservation techniques for OTFS waveform communications.

FIG. 1 illustrates an example of a wireless communications system 100 that supports tone reservation techniques for OTFS waveform communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical

10

(PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support tone reservation techniques for OTFS waveform communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some aspects, one or more UEs 115 and network entities 105 may communicate using OTFS frames. In accordance with various techniques discussed herein, OTFS-related communications may be transmitted with a tone reservation signal. The tone reservation signal may use a first subset of resources of a set of resources associated with an OTFS frame, which may mitigate relatively large PAPR associated with transmission of the OTFS frame. A tone reservation signal may use in-frame resources (e.g., as delay-Doppler locations within a delay-Doppler resource grid) of the OTFS frame, or may use tone reservation resources may correspond subcarriers that are out-of-band with subcarriers of an OTFS frame. Signaling may be provided by a transmitting device that indicates the tone reservation resources, and a receiving device may decode a received communication in accordance with remaining resources other than the tone reservation resources.

FIG. 2 illustrates an example of a wireless communications system 200 that supports tone reservation techniques for OTFS waveform communications in accordance with one or more aspects of the present disclosure. In some examples, wireless communications system 200 may implement aspects of wireless communications system 100 and may include a UE 115-a and a network entity 105-a, which may be examples of UEs 115 and a network entity 105 as described with reference to FIG. 1. Although described as communications between UE 115-a and the network entity 105-a, any type or quantity of devices may implement the techniques described herein. Further, the techniques described herein may be implemented by any type or quantity of devices of any wireless communications system.

The network entity 105-a may communicate with the UE 115-a that is positioned within a coverage area 110-a of the network entity 105-a. The network entity 105-a may be an example of a transmitting device or a receiving device, and may transmit downlink messages to the UE 115-a via a downlink channel 205-a and receive uplink messages from the UE 115-a via an uplink channel 205-b. The UE 115-a may be an example of a transmitting device or a receiving device, and may receive downlink messages from the network entity 105-a via the downlink channel 205-a and transmit uplink messages to the network entity 105-a via the uplink channel 205-b. For example, the network entity 105-a may transmit, to the UE 115-a, control signaling (e.g., RRC signaling, DCI, MAC-CE), data signaling, reference signals (e.g., demodulation reference signals (DMRSs), channel state information reference signals (CSI-RSs)), or the like, among other examples.

In some cases, such as in high-Doppler spread or high-mobility scenarios, the network entity 105-a may transmit messages to the UE 115-a using an OTFS waveform. OTFS waveforms may be based on channel estimation performed in a delay-Doppler domain, which may enable improved accuracy and reliability (e.g., compared to channel estimation performed in a time-frequency domain), especially when a channel is rapidly varying over time (e.g., when a receiver is moving at relatively high speeds, such as when located on a high-speed train, among other examples). For example, the network entity 105-a, the UE 115-a, or both, may generate a channel estimate based on one or more reference signals (such as pilot signals) in the delay-Doppler domain. A pilot signal in the delay-Doppler domain may be provided in a subset of resources that provide the network entity 105-a and the UE 115-a with sufficient time and frequency resources over which to estimate the channel (even in high-Doppler spread scenarios). For example, a pilot signal in the delay-Doppler domain may occupy a single delay-Doppler resource and be surrounded by other delay-Doppler resources that are zero in value, where the surrounding resources have a size that is larger than the delay and Doppler spread of the channel such that the pilot signal does not mix with non-zero value resources (e.g., resources that carry data). Thus, the delay-Doppler channel may be sparse and may occupy a relatively small portion or fraction of a delay-Doppler resource grid, which may support or be associated with delay or Doppler spreads that are relatively smaller (including some which may be much smaller) than a symbol duration and a subcarrier spacing (e.g., of a time-frequency domain), respectively. As such, the network entity 105-a and the UE 115-a may more accurately measure the delay and Doppler spreads of the channel, which may support a relatively more accurate estimation of the channel. In some cases, a pilot signal may occupy more than a single delay-Doppler resource (with corresponding surrounding resources that are zero in value) to provide for higher signal to noise ratio gain.

Additionally, in accordance with using a delay-Doppler channel, the network entity 105-a and the UE 115-a may more accurately measure or compute inter-carrier interference (ICI) that occurs in data channels (such as downlink channel 205-a), which may enable successful data detection. More specifically, instead of measuring and quantifying the time varying channel in the time-frequency domain, using the delay-Doppler domain may provide for reduced variability across time. As part of a more accurate estimation of the channel and more successful data detection, the network entity 105-a and the UE 115-a may have a greater reliability in successfully receiving and decoding information symbols carried by the signal, which may support greater spectral efficiency, higher data rates, and increased system capacity, among other benefits, across various and diverse deployment scenarios (e.g., including scenarios associated with high-Doppler spreads).

In some examples, an OTFS waveform may be achieved for transmission of an OTFS frame by preprocessing an underlying OFDM signal. For example, the network entity 105-a may prepare a downlink slot for a downlink transmission and may encode (i.e., precode) the downlink transmission according to an OTFS transmission scheme, as described in more detail with reference to FIG. 3. A delay-Doppler domain channel may be related to a time-frequency channel through a two-dimensional discrete Fourier transform (2D-DFT), such as an inverse symplectic Fast Fourier transform (ISFFT). Accordingly, the network entity 105-a may place a quantity of consecutive symbols of the downlink transmission in the delay-Doppler domain for the OTFS frame and may apply a 2D-DFT, which may place the symbols in a time-frequency domain. The network entity 105-a may perform OFDM processing and in some cases may additionally append (e.g., pre-append) a cyclic prefix to the downlink transmission in the slot, and may transmit the downlink transmission in the time-frequency domain to the UE 115-a via the downlink channel 205-a. The UE 115-a may perform corresponding operations in cases where the UE 115-a is the transmitting device.

Upon reception of the downlink transmission, the UE 115-*a* may decode the downlink transmission in accordance with the OTFS transmission scheme. That is, the UE 115-*a* may receive the downlink transmission in the time-frequency domain and may decode the downlink transmission via a 2D-IDFT to convert the symbols back to the delay-Doppler domain to obtain an OTFS frame, and then decode an information signal of the OTFS frame.

As discussed herein, communications with OTFS frames may exhibit relatively high PAPRs, and various described techniques provide for application of a tone reservation signal for OTFS waveform communications, which may reduce associated PAPRs and enhance communications efficiency. In some cases, network entity 105-*a* may transmit a configuration message 210 to the UE 115-*a* to enable OTFS-based communications. Further, in some cases, the configuration message 210 may also enable tone reservations for some resources associated with OTFS-based communications. In accordance with the OTFS configuration, the network entity 105-*a* may transmit one or more signals 215 to the UE 115-*a* that use tone reservation for a subset of resources. Likewise, the UE 115-*a* may transmit one or more signals 220 to the network entity 105-*a* that use tone reservation for a subset of resources.

In some cases, a tone reservation signal may use a first subset of resources of a set of resources associated with an OTFS frame, which may mitigate relatively large PAPR associated with transmission of the OTFS frame. In some cases, tone reservation may use in-frame resources (e.g., as delay-Doppler locations within a delay-Doppler resource grid) of the OTFS frame. In some cases, one Doppler location may be selected for each available delay location of the delay-Doppler resource grid. In other cases, a different Doppler location may be selected for one or more different delay locations of the delay-Doppler resource grid. In other aspects, tone reservation resources may correspond subcarriers that are out-of-band with subcarriers of an OTFS frame. For example, tone reservation subcarriers may be above and/or below resources of an OTFS frame in the frequency domain. Additionally or alternatively, tone reservation subcarriers may be provided between two or more different sets of OTFS frame resources. In some cases, one or more of signal 215 or signal 220 may include an indication the tone reservation resources, and a receiving device may decode a received communication in accordance with remaining resources other than the tone reservation resources.

Figure 3:
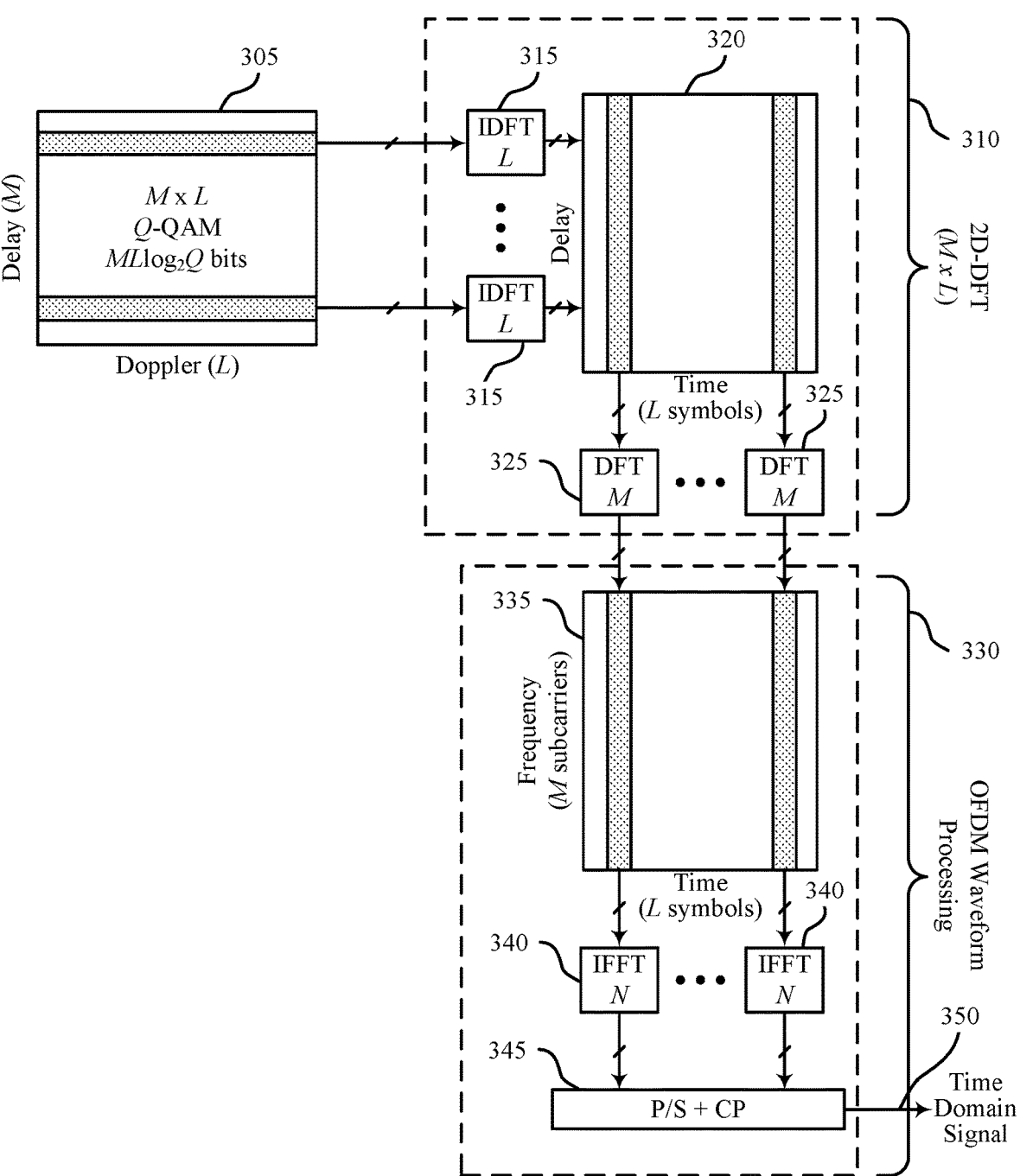
FIG. 3 illustrates an example of an OTFS transmission scheme that supports tone reservation techniques for OTFS waveform communications in accordance with one or more aspects of the present disclosure.

FIG. 3 illustrates an example of a OTFS transmission scheme 300 that supports tone reservation techniques for OTFS waveform communications in accordance with one or more aspects of the present disclosure. The OTFS transmission scheme 300 may be implemented to realize aspects of the wireless communications system 100, or the wireless communications system 200. For example, a network entity and a UE (e.g., a network entity 105-*a* and a UE 115-*a*, respectively, as described with reference to FIG. 2), may perform one or more operations of the OTFS transmission scheme 300 to support an OTFS transmitter implementation according to which tone reservation resources may be used to mitigate relatively high PAPRs.

In the example of FIG. 3, a transmitting device may convert an OTFS frame 305 in delay-Doppler domain symbols to a time-frequency domain frame 335 through 2D-DFT processing 310. For example, the network entity may allocate or place information symbols to be transmitted as part of a delay-Doppler domain frame with a delay-domain size of M and a Doppler-domain size of N. Accordingly, a set of delay-Doppler domain resources of OTFS frame 305 may have dimensions of M×N. For some modulation techniques, such as a quadrature-amplitude modulation (QAM) or a quotient QAM (Q-QAM), the delay-Doppler domain resources of OTFS frame 305 may convey $MN*\log_2(Q)$ bits.

The 2D-DFT processing 310 may include a length L inverse discrete Fourier transform (IDFT) 315 to convert a M×L delay-Doppler frame into a M×L delay-time frame 320, which may be provided to a length M DFT 325 to generate time-frequency domain frame 335 across M subcarriers in the frequency domain and L symbols in the time domain for OFDM waveform processing 330. A length N inverse fast Fourier transform (IFFT) may be performed on the time-frequency domain frame 335, which may be provided to parallel-to-serial (P/S) and cyclic prefix (CP) component 345 to generate time domain signal 350.

In some aspects, the performance of the IFFT 340 on the set of time-frequency domain frame 335 may involve one or more processing steps that are associated with (e.g., identical to) processing associated with an OFDM waveform. In some aspects, the time-domain signal 350 may include a quantity of N symbols and each of the N symbols may include or convey M symbols that belong to an OTFS frame (e.g., with remaining N-M symbols including a separate allocation of resources).

Accordingly, in some implementations, the transmitting device may perform operations such as associated with both the OTFS and the OFDM processing to generate and output an OTFS-precoded time-domain signal 350. A receiving device may receive the time-domain signal 350 and, in some implementations, may perform one or more operations associated with reversing the operations described of the OTFS transmission scheme 300 to demodulate and decode the time-domain signal 350. In accordance with various aspects discussed herein, a subset of resources associated with an OTFS transmission may be reserved in accordance with tone reservation techniques to provide a reduced PAPR relative to a transmission without tone reservation. Some non-limiting examples of tone reservation techniques are discussed in more detail with reference to FIGS. 4 through 6. Such tone reservation may reduce PAPR, thus allowing a higher average transmission power and improved signal to noise ratio (SNR) at the receiving device, which may provide higher spectral efficiency and less power consumption.

Figure 4:
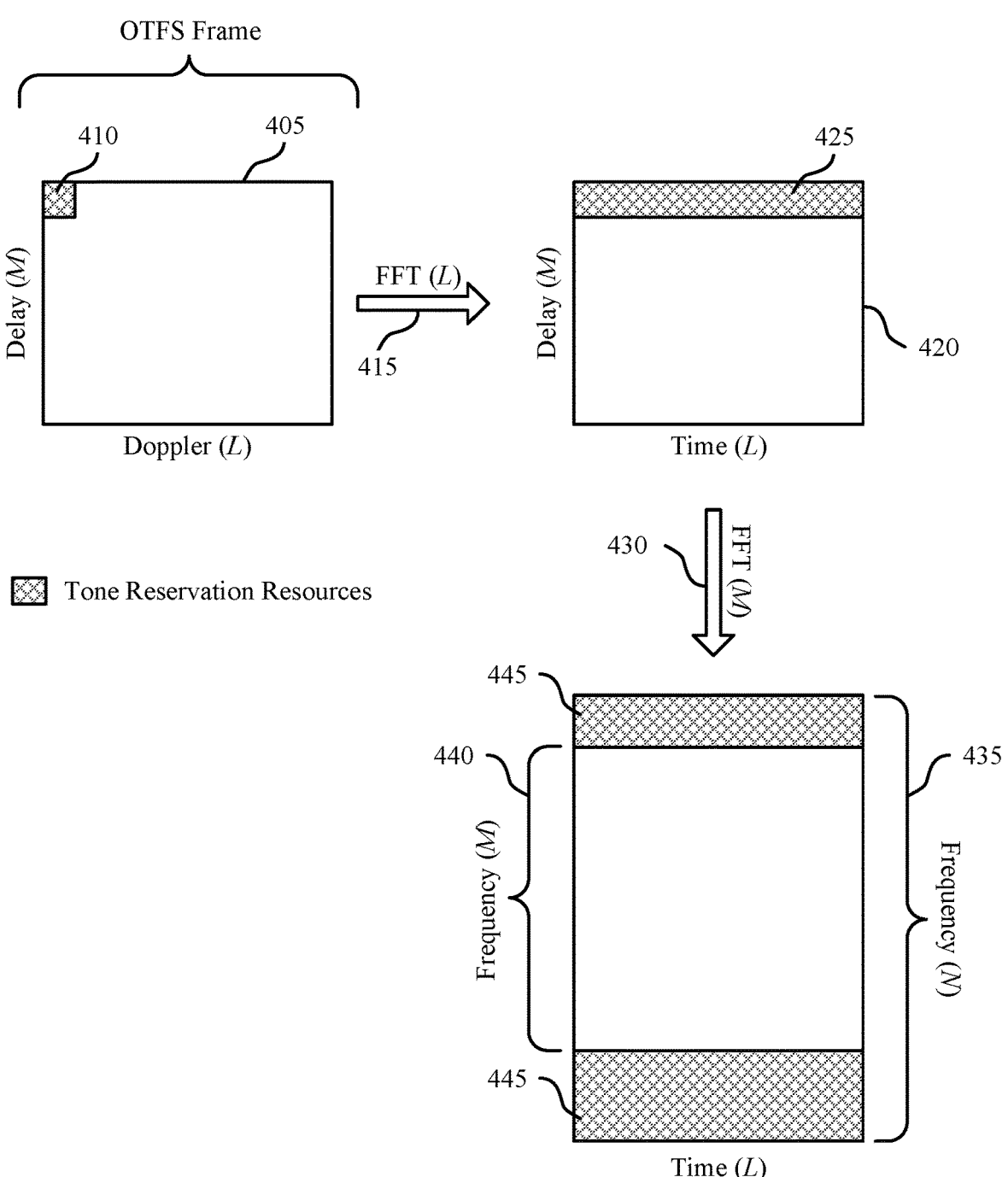
FIG. 4 illustrates an example of an OTFS transmission scheme with in-frame tone reservation that supports tone reservation techniques for OTFS waveform communications in accordance with one or more aspects of the present disclosure.

FIG. 4 illustrates an example of a OTFS transmission scheme with an in-frame tone reservation 400 that supports tone reservation techniques for OTFS waveform communications in accordance with one or more aspects of the present disclosure. The OTFS transmission scheme with in-frame tone reservation 400 may be implemented to realize aspects of the wireless communications system 100, or the wireless communications system 200. For example, a network entity and a UE (e.g., a network entity 105-*a* and a UE 115-*a*, respectively, as described with reference to FIG. 2), may perform one or more operations of the OTFS transmission scheme with in-frame tone reservation 400 to support an OTFS transmitter implementation according to which tone reservation resources may be used to mitigate relatively high PAPRs.

In the example of FIG. 4, a transmitting device may identify a tone reservation resource 410 in an OTFS frame 405, as a symbol having an associated delay location (e.g., of M available delay locations of the OTFS frame) and an associated Doppler location (e.g., of L available Doppler locations of the OTFS frame). A first FFT 415 of length L applied across the Doppler axis, and the Doppler axis is converted to time and the single delay-Doppler tone reservation resource 410 resource is integrated into an entire first delay 425 of a delay-time frame 420. A second FFT 430 of length M may be applied along the delay or "fast time" axis to convert to frequency, and each of the points across the first delay 425 are integrated into an entire column, so that the single resource in the delay-Doppler domain now affects M subcarriers 440 in each of the L symbols in the OFDM frame. Each symbol in the OFDM frame use N subcarriers 435, where N may be greater than M, and provide tone reservation resources 445 as subcarriers in the time-frequency domain. An example of in-frame tone reservation is discussed in more detail with reference to FIG. 5.

Figure 5:
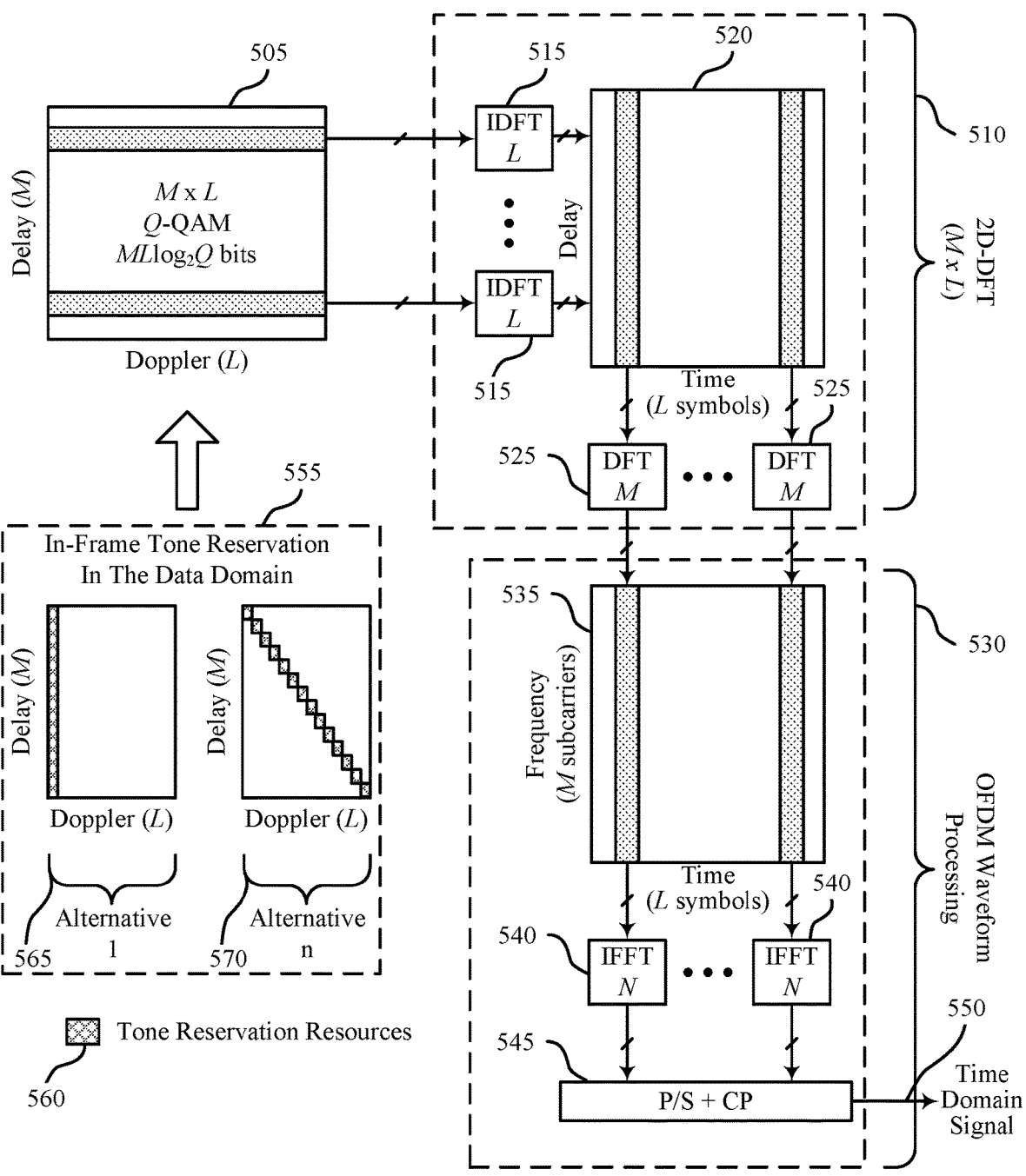
FIG. 5 illustrates an example of an OTFS transmission scheme with in-frame tone reservation that supports tone reservation techniques for OTFS waveform communications in accordance with one or more aspects of the present disclosure.

FIG. 5 illustrates an example of a OTFS transmission scheme with in-frame tone reservation 500 that supports tone reservation techniques for OTFS waveform communications in accordance with one or more aspects of the present disclosure. The OTFS transmission scheme with in-frame tone reservation 500 may be implemented to realize aspects of the wireless communications system 100, or the wireless communications system 200. For example, a network entity and a UE (e.g., a network entity 105-*a* and a UE 115-*a*, respectively, as described with reference to FIG. 2), may perform one or more operations of the OTFS transmission scheme with in-frame tone reservation 500 to support an OTFS transmitter implementation according to which tone reservation resources may be used to mitigate relatively high PAPRs.

In this example, similarly to the example of FIG. 3, a transmitting device may convert an OTFS frame 505 in delay-Doppler domain symbols to a time-frequency domain frame 535 through 2D-DFT processing 510. For example, the network entity may allocate or place information symbols to be transmitted as part of a delay-Doppler domain frame with a delay-domain size of M and a Doppler-domain size of L. Accordingly, a set of delay-Doppler domain resources of OTFS frame 505 may have dimensions of M×L. The 2D-DFT processing 510 may include a length L IDFT 515 to convert a M×L delay-Doppler frame into a M×L delay-time frame 520, which may be provided to a length M DFT 525 to generate time-frequency domain frame 535 across M subcarriers in the frequency domain and L symbols in the time domain for OFDM waveform processing 530. A length N IFFT 540 may be performed on the time-frequency domain frame 535, which may be provided to P/S and CP component 545 to generate time domain signal 550.

In this example, in-frame tone reservation in the data domain 555 may provide a subset of delay-Doppler resources as tone reservation resources 560. Thus, in this example, tones are incorporated as delay-Doppler locations. As discussed with reference to FIG. 4, each resource location affects an entire Doppler domain (i.e., all time locations for a specific delay), but may have a small effect on neighboring delays, and thus it may be beneficial to spread the tone reservation resources 560 (e.g., delay-Doppler symbols) across the delay axis. Such spreading of the tone reservation resources 560 may be performed in accordance with numerous alternatives, two of which are illustrated in FIG. 5. In a first alternative 565, the tone reservation resources 560 may include a same Doppler resource for each delay resource. In an nth alternative 570, the tone reservation resources 560 may include different Doppler resources for one or more delay resources, in a pattern as illustrated. In still further alternatives, more than one tone reservation resource may be provided for each delay resource. In some cases, tone reservation signals are not part of a transmitted constellation, and a guard area may be provided around tone reservation locations to help enhance receiver performance.

In other examples, such as discussed with reference to FIG. 6, tone reservation may be performed out-of-frame with respect to the OTFS frame.

FIG. 6 illustrates an example of a OTFS transmission scheme with out-of-frame tone reservation 600 that supports tone reservation techniques for OTFS waveform communications in accordance with one or more aspects of the present disclosure. The OTFS transmission scheme with out-of-frame tone reservation 600 may be implemented to realize aspects of the wireless communications system 100, or the wireless communications system 200. For example, a network entity and a UE (e.g., a network entity 105-*a* and a UE 115-*a*, respectively, as described with reference to FIG. 2), may perform one or more operations of the OTFS transmission scheme with out-of-frame tone reservation 600 to support an OTFS transmitter implementation according to which tone reservation resources may be used to mitigate relatively high PAPRs.

In this example, similarly to the example of FIGS. 3 and 5, a transmitting device may convert an OTFS frame 605 in delay-Doppler domain symbols to a time-frequency domain frame 635 through 2D-DFT processing 610. For example, the network entity may allocate or place information symbols to be transmitted as part of a delay-Doppler domain frame with a delay-domain size of M and a Doppler-domain size of L. Accordingly, a set of delay-Doppler domain resources of OTFS frame 605 may have dimensions of M×L. The 2D-DFT processing 610 may include a length L IDFT 615 to convert a M×L delay-Doppler frame into a M×L delay-time frame 620, which may be provided to a length M DFT 625 to generate time-frequency domain frame 635 across M subcarriers in the frequency domain and L symbols in the time domain for OFDM waveform processing 630. A length N IFFT 640 may be performed on the time-frequency domain frame 635, which may be provided to P/S and CP component 645 to generate time domain signal 650.

In this example, out-of-frame tone reservation in the frequency data domain 655 may provide a subset of delay-Doppler resources as tone reservation resources 660 as different subcarriers in the frequency domain, after transformation to the frequency time space (OFDM space). Numerous alternatives of placement of tone reservation resources 660 may be used, two of which are illustrated in FIG. 6. In a first alternative 665, tone reservation subcarriers may be placed above subcarriers of OTFS frame, below subcarriers of the OTFS frame, or both. In an nth alternative 670, the OTFS frame may be split into several allocations and tone reservation resources 660 provided in-between OTFS frames, as well as above and/or below OTFS frames.

In some cases, a transmitting device operating in accordance with the techniques discussed herein may evaluates PAPR for relevant constellations, and determine a tone reservation pattern and percentage that is to be applied to communications to achieve a target PAPR. In some cases, such as for in-band tone reservation, tone reservation locations within a delay-Doppler resource grid may be signaled to a receiving device. Such an indication may be provided, in some cases, per allocation in control information (e.g. DCI), in a RRC message, according to a pre-defined set of tone reservation locations, as an index value mapped to multiple predefined options, or any combinations thereof. In cases where out-of-frame tone reservation is used only above and/or below an OTFS frame (e.g., outside of OTFS frames), the tone reservation may be transparent to the receiving device, and signaling may not be transmitted to indicate tone reservation resources. In cases where tone reservation resources are located between OTFS frames in the frequency domain, a split scheme for several OTFS allocations may be signaled (e.g., per slot, in one or more RRC messages, according to a predefined scheme, or as an index value mapped to a predefined scheme). The receiving device may receive an indication that tone reservation is activated, and the number of subcarriers used for the tone reservation and constellation. As discussed, such signaling may be provided via a RRC message, DCI or MAC-CE, for example. The receiving device may discard tones associated with the tone reservation signal from the data symbols and decode the received communication.

Figure 7:
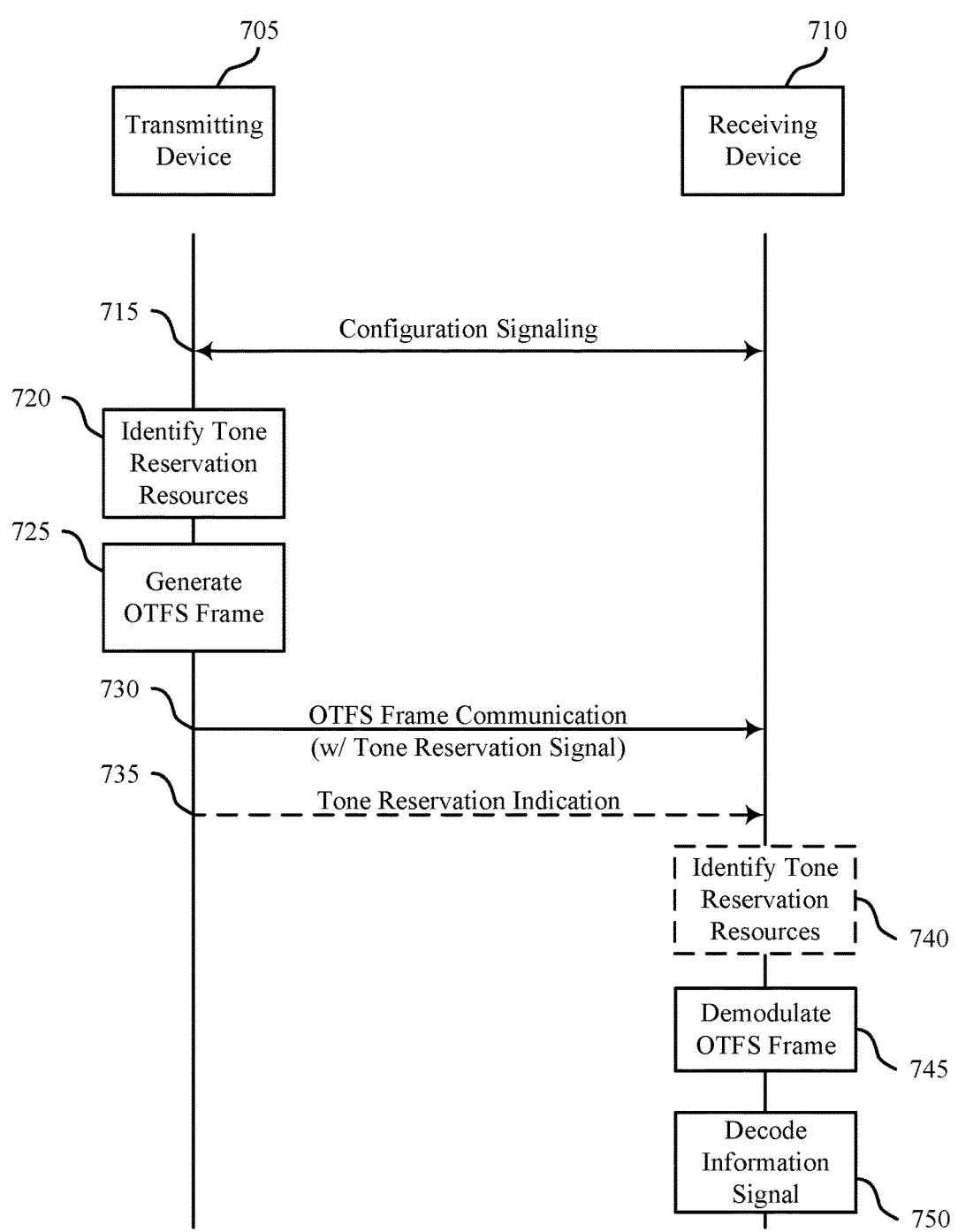
FIG. 7 illustrates an example of a process flow that supports tone reservation techniques for OTFS waveform communications in accordance with one or more aspects of the present disclosure.

FIG. 7 illustrates an example of a process flow 700 that supports tone reservation techniques for OTFS waveform communications in accordance with one or more aspects of the present disclosure. In some examples, the process flow 700 may be implemented by aspects of a wireless communications system 100 and a wireless communications system 200. For example, the process flow 700 may be implemented by a UE 115 and network entity 105 as described with reference to FIGS. 1 and 2. Alternative examples of the following may be implemented, where some steps are performed in a different order than described or are not performed at all. In some cases, steps may include additional features not mentioned below, or further steps may be added.

At 715, a transmitting device 705 and a receiving device 710 may exchange configuration signaling associated with OTFS-based communications and tone reservation associated with the OTFS-based communications. In some cases, the transmitting device 705 may indicate that OTFS waveform communications are enabled, and may indicate a first subset of a set of resources associated with OTFS frames, the first subset of resources associated with a tone reservation signal. In some cases, the receiving device 710 may request that tone reservation be used for communications via OTFS frames (e.g., based on channel measurements of a communications channel between the transmitting device 705 and receiving device 710. In some examples, the configuration signaling may be included in RRC signaling, in uplink or downlink control signaling, in one or more MAC-CEs, or any combinations thereof.

At 720, the transmitting device 705 may identify tone reservation resources. Identification of tone reservation resources may be performed in accordance with various techniques discussed herein, and may include identification of in-frame resources within an OTFS frame (e.g., delay-Doppler resources), identification of out-of-frame resources outside of OTFS frames (e.g., subcarriers in the frequency domain), or any combinations thereof. At 725, the transmitting device 705 may generate an OTFS frame in accordance with the identified tone reservation resources. In some cases, generation of the OTFS frame may include generating a tone reservation signal for transmission via a first subset of resources of a set of resources associated with transmission of the OTFS frame (e.g., that span a delay-Doppler resource grid associated with the OTFS frame for communications between the transmitting device 705 and the receiving device 710). In cases where in-frame tone reservation is used, the first subset of resource may include delay-Doppler resources. In cases where out-of-frame tone reservation is used, the first subset of resources may include frequency-domain resources (e.g., one or more subcarriers) in time-frequency resources. In some cases, generation of the OTFS frame may include generating an information signal for transmission via a second subset of resources of the set of resources associated with transmission of the OTFS frame, the information signal including information bits modulated according to an OTFS waveform. In some cases, based on the data signal to be transmitted, a desired tone reservation signal may be generated and the resources selected for the tone reservation signal based on the desired tone reservation signal, where the resource selection may be performed in an iterative manner based on a PAPR of the overall signal with the tone reservation resources. For example, in some cases, due to limited resources that may be used for tone reservation, the tone reservation symbols may not align exactly with the desired tone reservation signal, and selection of tone reservation symbols may be iterative based on an expected PAPR of different options for the selection of tone reservation symbols.

At 730, the transmitting device 705 may transmit, and the receiving device 710 may receive, a communication that includes the OTFS frame. As discussed herein, in some cases such a communication may be an OFDM waveform that includes an OTFS frame. In some cases, the communication may be an OTFS frame that is transmitted without conversion to an OFDM waveform. Optionally, at 735, the transmitting device 705 may transmit, and receiving device 710 may receive, a tone reservation indication that indicates the resources associated with the tone reservation signal. In some cases, the tone reservation indication may indicate delay-Doppler resources that are tone reservation resources. The tone reservation indication, if present, may be transmitted in control signaling (e.g., DCI), via RRC signaling, via a MAC-CE, or any combinations thereof.

Optionally, at 740, the receiving device 710 may identify tone reservation resources. In some cases, when out-of-frame tone reservation resources are used, the receiving device 710 may demodulate and decode the communication based on resources associated with an OTFS frame and thus tone reservation in frequency domain resources may be transparent to the receiving device 710. In other cases, when in-frame tone reservation resources are used, the tone reservation indication may provide information related to particular delay-Doppler resources associated with the tone reservation signal. At 745, the receiving device 710 may demodulate the OTFS frame, and at 750 the receiving device 710 may decode the information signal. In cases where in-frame tone reservation is used, the receiving device 710 may discard information from tone reservation resources when decoding the OTFS frame.

FIG. 8 illustrates a block diagram 800 of a device 805 that supports tone reservation techniques for OTFS waveform communications in accordance with one or more aspects of the present disclosure. The device 805 may be an example of aspects of a UE 115 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to tone reservation techniques for OTFS waveform communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to tone reservation techniques for OTFS waveform communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of tone reservation techniques for OTFS waveform communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a transmitting device in accordance with examples as disclosed herein. For example, the communications manager 820 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 820 may be configured as or otherwise support a means for generating an information signal for transmission via a second subset of resources of the set of multiple resources for the OTFS frame, the information signal including information bits modulated according to an OTFS waveform. The communications manager 820 may be configured as or otherwise support a means for transmitting, to the receiving device, the tone reservation signal via the first subset of resources and the information signal via the second subset of resources.

Additionally, or alternatively, the communications manager 820 may support wireless communication at a receiving device in accordance with examples as disclosed herein. For example, the communications manager 820 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 820 may be configured as or otherwise support a means for decoding the information signal from the second subset of resources based on the second subset of resources and the OTFS waveform.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for tone reservation in communications using OTFS frames to mitigate relatively high PAPR, which may provide for more efficient utilization of communication resources and reduced processing power.

Figure 9:
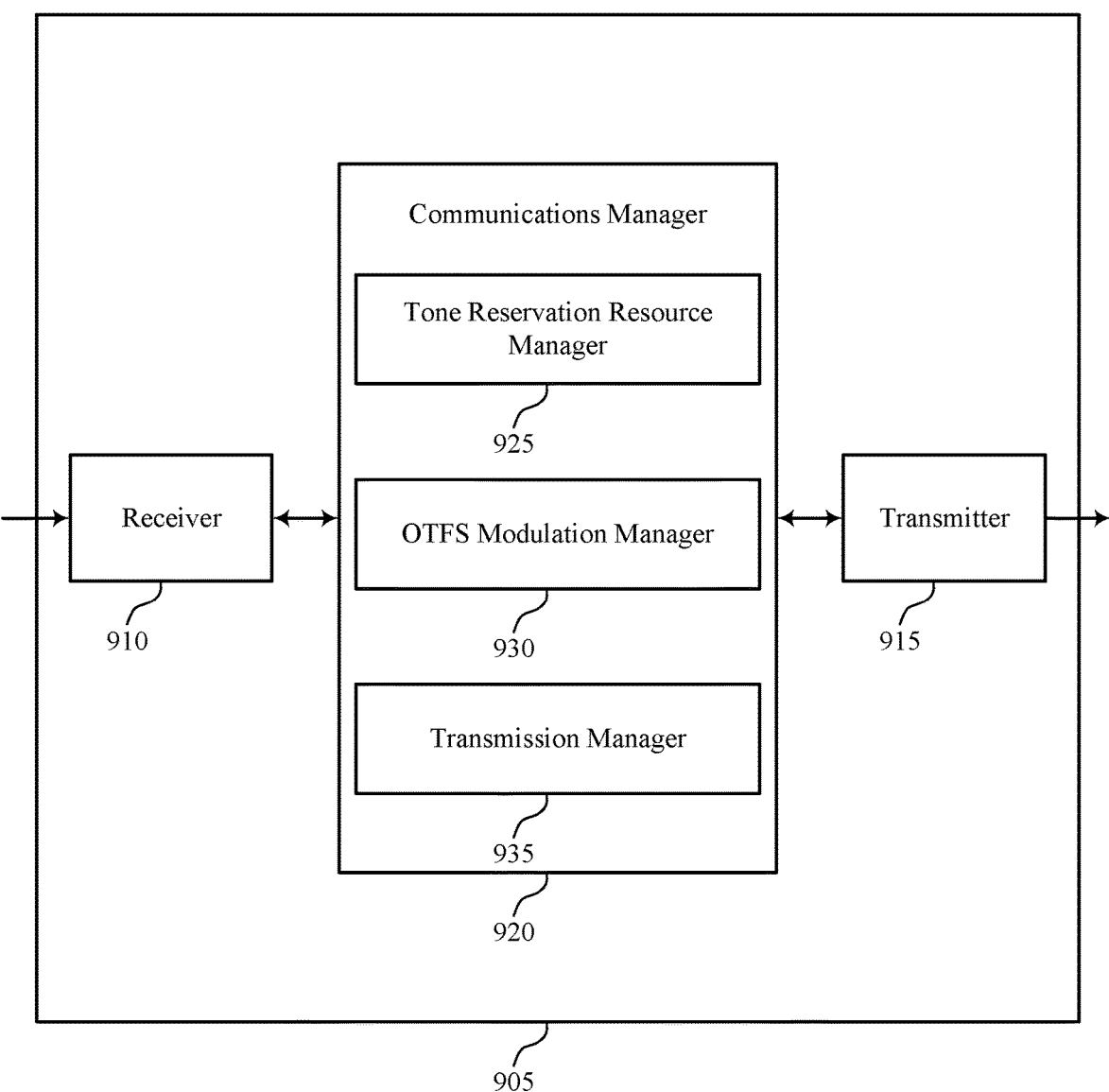

FIG. 9 illustrates a block diagram 900 of a device 905 that supports tone reservation techniques for OTFS waveform communications in accordance with one or more aspects of the present disclosure. The device 905 may be an example of aspects of a device 805, a UE 115, or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to tone reservation techniques for OTFS waveform communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to tone reservation techniques for OTFS waveform communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of tone reservation techniques for OTFS waveform communications as described herein. For example, the communications manager 920 may include a tone reservation resource manager 925, an OTFS modulation manager 930, a transmission manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a transmitting device in accordance with examples as disclosed herein. The tone reservation resource manager 925 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The OTFS modulation manager 930 may be configured as or otherwise support a means for generating an information signal for transmission via a second subset of resources of the set of multiple resources for the OTFS frame, the information signal including information bits modulated according to an OTFS waveform. The transmission manager 935 may be configured as or otherwise support a means for transmitting, to the receiving device, the tone reservation signal via the first subset of resources and the information signal via the second subset of resources.

Additionally, or alternatively, the communications manager 920 may support wireless communication at a receiving device in accordance with examples as disclosed herein. The OTFS modulation manager 930 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The tone reservation resource manager 925 may be configured as or otherwise support a means for decoding the information signal from the second subset of resources based on the second subset of resources and the OTFS waveform.

Figure 10:
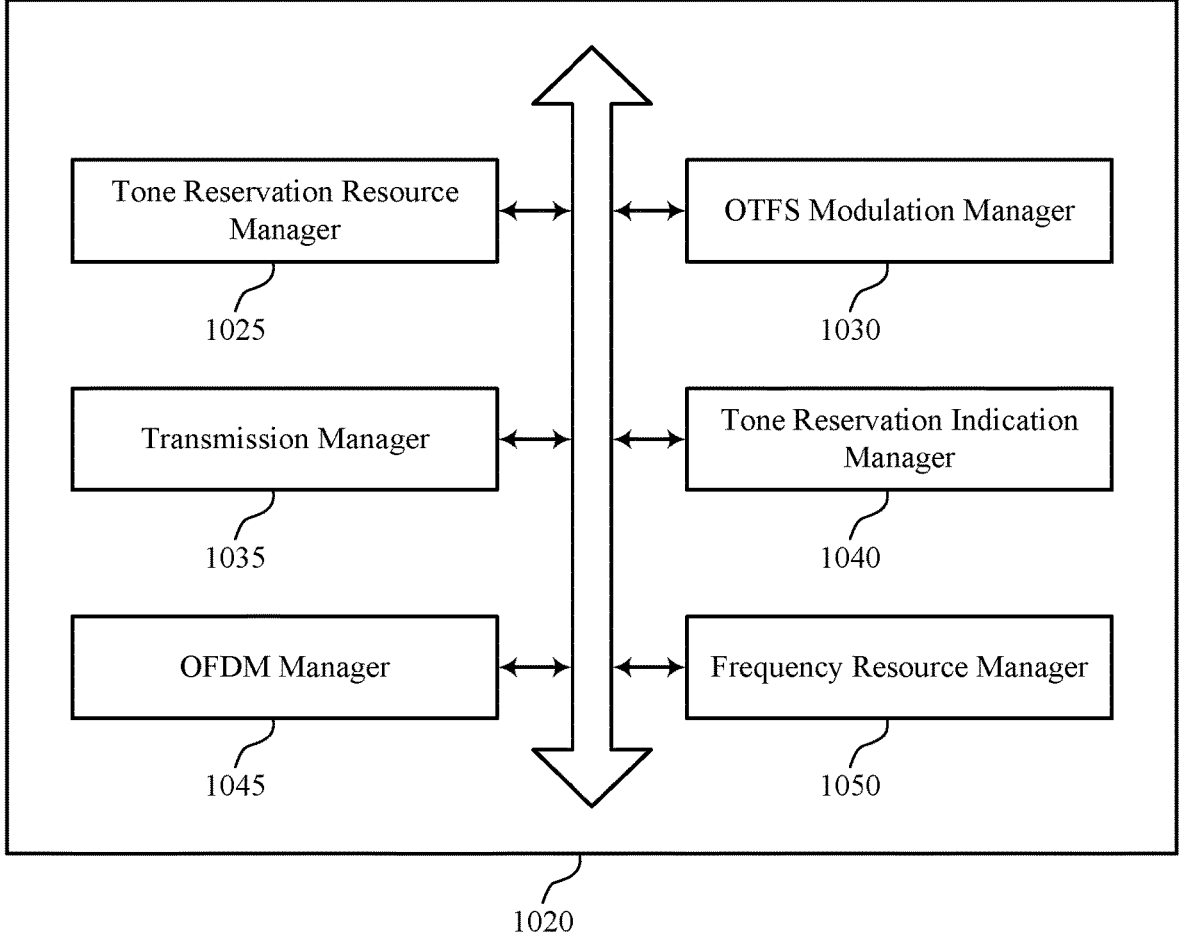
FIG. 10 illustrates a block diagram of a communications manager that supports tone reservation techniques for OTFS waveform communications in accordance with one or more aspects of the present disclosure.

FIG. 10 illustrates a block diagram 1000 of a communications manager 1020 that supports tone reservation techniques for OTFS waveform communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of tone reservation techniques for OTFS waveform communications as described herein. For example, the communications manager 1020 may include a tone reservation resource manager 1025, an OTFS modulation manager 1030, a transmission manager 1035, a tone reservation indication manager 1040, an OFDM manager 1045, a frequency resource manager 1050, or any combination thereof.

Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a transmitting device in accordance with examples as disclosed herein. The tone reservation resource manager 1025 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The OTFS modulation manager 1030 may be configured as or otherwise support a means for generating an information signal for transmission via a second subset of resources of the set of multiple resources for the OTFS frame, the information signal including information bits modulated according to an OTFS waveform. The transmission manager 1035 may be configured as or otherwise support a means for transmitting, to the receiving device, the tone reservation signal via the first subset of resources and the information signal via the second subset of resources.

In some examples, integration of the tone reservation signal via the first subset of resources provides a reduced peak to average power ratio (PAPR) relative to a PAPR of the information signal using the OTFS frame that occupies all resources of the set of multiple resources. In some examples, the first subset of resources include a first subset of delay-Doppler symbols in the delay-Doppler resource grid.

In some examples, to support generating the tone reservation signal, the tone reservation resource manager 1025 may be configured as or otherwise support a means for selecting a set of multiple delay-Doppler symbols in the delay-Doppler resource grid as tone reservation symbols, where the tone reservation symbols in the delay-Doppler resource grid are transformed into time resources and frequency resources for transmission to the receiving device. In some examples, the tone reservation symbols are selected as one Doppler location for each delay location of the delay-Doppler resource grid, more than one Doppler location for each delay location of the delay-Doppler resource grid, or less than one Doppler location for each delay location of the delay-Doppler resource grid. In some examples, the Doppler location of the tone reservation symbols is a same Doppler location for each delay location of the delay-Doppler resource grid. In some examples, the Doppler location of the tone reservation symbols is a different Doppler location for one or more different delay locations of the delay-Doppler resource grid.

In some examples, the first subset of resources are out-of-frame resources that occupy one or more resources outside of the OTFS frame. In some examples, the one or more resources correspond to one or more subcarriers of a set of multiple subcarriers associated with the OTFS frame, the first subset of resources correspond to a first subset of subcarriers, and the second subset of resources correspond to a second subset of subcarriers, and where the first subset of subcarriers are higher frequency subcarriers than the second subset of subcarriers, are lower frequency subcarriers than the second subset of subcarriers, or any combinations thereof. In some examples, the second subset of subcarriers are divided into two or more separate frequency allocations to provide two or more separate OTFS frames, and one or more subcarriers of the first subset of subcarriers are located between the two or more separate frequency allocations.

In some examples, to support generating the tone reservation signal, the tone reservation resource manager 1025 may be configured as or otherwise support a means for determining a tone reservation pattern and a quantity of resources associated with the tone reservation signal based on one or more channel measurements of a channel between the transmitting device and the receiving device. In some examples, to support generating the tone reservation signal, the tone reservation indication manager 1040 may be configured as or otherwise support a means for transmitting an indication of the tone reservation pattern and the quantity of resources associated with the tone reservation signal to the receiving device. In some examples, the indication of the tone reservation pattern and the quantity of resources associated with the tone reservation signal is provided via one or more of a control signaling communication, an RRC communication, a medium access control (MAC) control element, or any combinations thereof. In some examples, the indication of the tone reservation pattern and the quantity of resources associated with the tone reservation signal includes an index value of a set of multiple index values that are mapped to different tone reservation patterns and quantities of resources. In some examples, the tone reservation signal includes a guard area to provide for interference mitigation between the tone reservation signal and the information signal.

Additionally, or alternatively, the communications manager 1020 may support wireless communication at a receiving device in accordance with examples as disclosed herein. In some examples, the OTFS modulation manager 1030 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. In some examples, the tone reservation resource manager 1025 may be configured as or otherwise support a means for decoding the information signal from the second subset of resources based on the second subset of resources and the OTFS waveform. In some examples, the first subset of resources include a first subset of delay-Doppler symbols in the delay-Doppler resource grid.

In some examples, to support decoding the information signal, the OFDM manager 1045 may be configured as or otherwise support a means for transforming a first set of received orthogonal frequency division multiplexing (OFDM) modulation symbols in a time-frequency resource grid into a second set of delay-Doppler symbols in the delay-Doppler resource grid. In some examples, to support decoding the information signal, the tone reservation resource manager 1025 may be configured as or otherwise support a means for determining a subset of delay-Doppler symbols of the second set of delay-Doppler symbols that are tone reservation symbols. In some examples, to support decoding the information signal, the tone reservation resource manager 1025 may be configured as or otherwise support a means for discarding the tone reservation symbols from the second set of delay-Doppler symbols to obtain a set of information symbols. In some examples, to support decoding the information signal, the OTFS modulation manager 1030 may be configured as or otherwise support a means for decoding the set of information symbols based on the OTFS waveform.

In some examples, the tone reservation symbols are provided as one Doppler location for each delay location of the delay-Doppler resource grid, more than one Doppler location for each delay location of the delay-Doppler resource grid, or less than one Doppler location for each delay location of the delay-Doppler resource grid. In some examples, the first subset of resources are out-of-frame resources that occupy one or more resources outside of the OTFS frame.

In some examples, the tone reservation indication manager 1040 may be configured as or otherwise support a means for receiving, from the transmitting device, an indication of a tone reservation pattern and a quantity of resources associated with the tone reservation signal. In some examples, the indication of the tone reservation pattern and the quantity of resources associated with the tone reservation signal is provided via one or more of a control signaling communication, an RRC communication, a MAC control element, or any combinations thereof. In some examples, the indication of the tone reservation pattern and the quantity of resources associated with the tone reservation signal includes an index value of a set of multiple index values that are mapped to different tone reservation patterns and quantities of resources.

Figure 11:
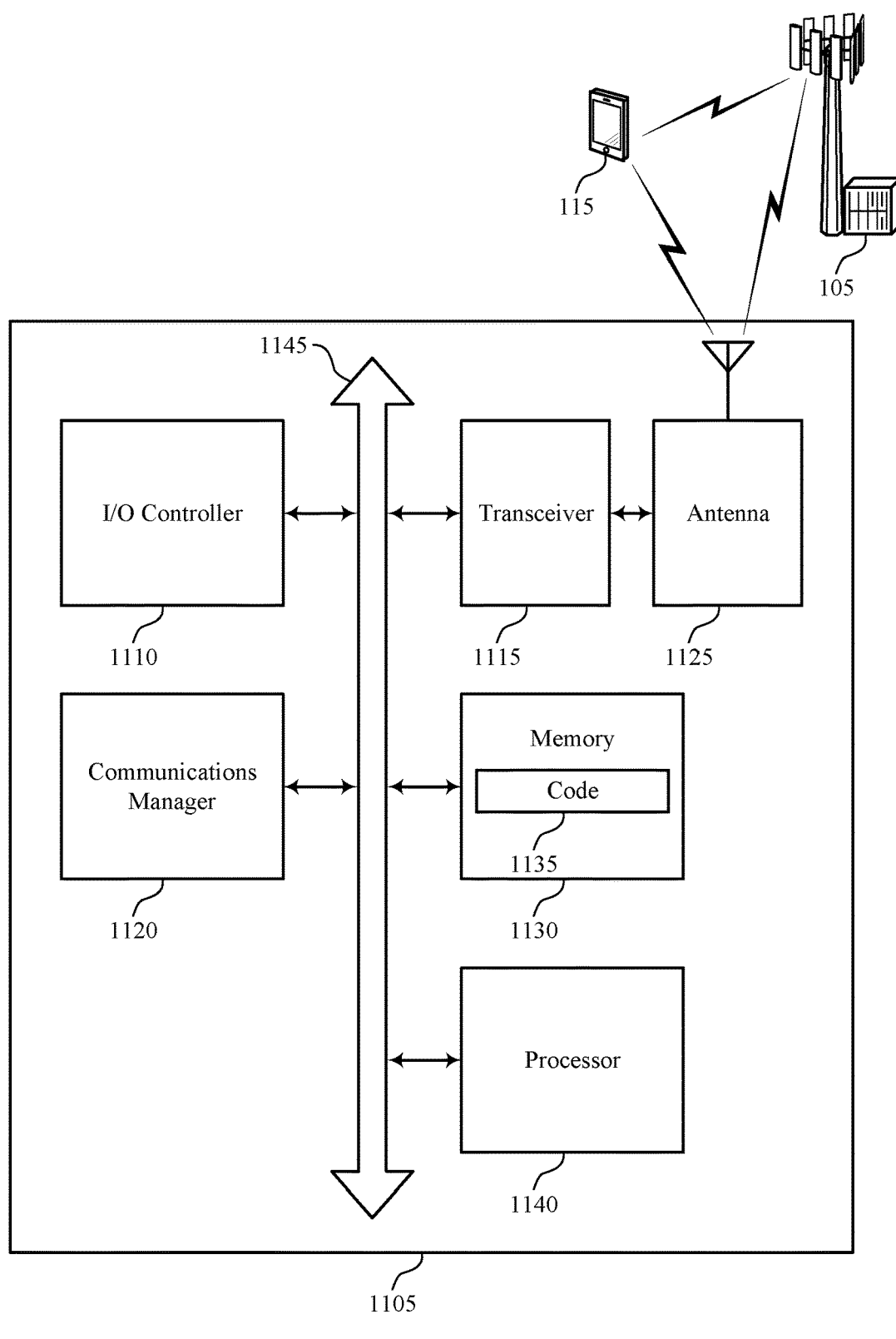
FIG. 11 illustrates a diagram of a system including a UE that supports tone reservation techniques for OTFS waveform communications in accordance with one or more aspects of the present disclosure.

FIG. 11 illustrates a diagram of a system 1100 including a device 1105 that supports tone reservation techniques for OTFS waveform communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting tone reservation techniques for OTFS waveform communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a transmitting device in accordance with examples as disclosed herein. For example, the communications manager 1120 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 1120 may be configured as or otherwise support a means for generating an information signal for transmission via a second subset of resources of the set of multiple resources for the OTFS frame, the information signal including information bits modulated according to an OTFS waveform. The communications manager 1120 may be configured as or otherwise support a means for transmitting, to the receiving device, the tone reservation signal via the first subset of resources and the information signal via the second subset of resources.

Additionally, or alternatively, the communications manager 1120 may support wireless communication at a receiving device in accordance with examples as disclosed herein. For example, the communications manager 1120 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 1120 may be configured as or otherwise support a means for decoding the information signal from the second subset of resources based on the second subset of resources and the OTFS waveform.

By including or configuring the communications manager 1120 in accordance with examples as described herein, the device 1105 may support techniques for tone reservation in communications using OTFS frames to mitigate relatively high PAPR, which may provide for more efficient utilization of communication resources, reduced processing power, improved communication reliability, and improved user experience related to reduced processing, reduced power consumption, more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of tone reservation techniques for OTFS waveform communications as described herein, or the processor 1140 and the memory 1130 may be otherwise configured to perform or support such operations.

Figure 12:
FIG. 12 illustrates a diagram of a system including a network entity that supports tone reservation techniques for OTFS waveform communications in accordance with one or more aspects of the present disclosure.

FIG. 12 illustrates a diagram of a system 1200 including a device 1205 that supports tone reservation techniques for OTFS waveform communications in accordance with one or more aspects of the present disclosure. The device 1205 may be an example of or include the components of a device 805, a device 905, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting tone reservation techniques for OTFS waveform communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a transmitting device in accordance with examples as disclosed herein. For example, the communications manager 1220 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 1220 may be configured as or otherwise support a means for generating an information signal for transmission via a second subset of resources of the set of multiple resources for the OTFS frame, the information signal including information bits modulated according to an OTFS waveform. The communications manager 1220 may be configured as or otherwise support a means for transmitting, to the receiving device, the tone reservation signal via the first subset of resources and the information signal via the second subset of resources.

Additionally, or alternatively, the communications manager 1220 may support wireless communication at a receiving device in accordance with examples as disclosed herein. For example, the communications manager 1220 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 1220 may be configured as or otherwise support a means for decoding the information signal from the second subset of resources based on the second subset of resources and the OTFS waveform.

By including or configuring the communications manager 1220 in accordance with examples as described herein, the device 1205 may support techniques for tone reservation in communications using OTFS frames to mitigate relatively high PAPR, which may provide for more efficient utilization of communication resources, reduced processing power, improved communication reliability, and improved user experience related to reduced processing, reduced power consumption, more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of tone reservation techniques for OTFS waveform communications as described herein, or the processor 1235 and the memory 1225 may be otherwise configured to perform or support such operations.

Figure 13:
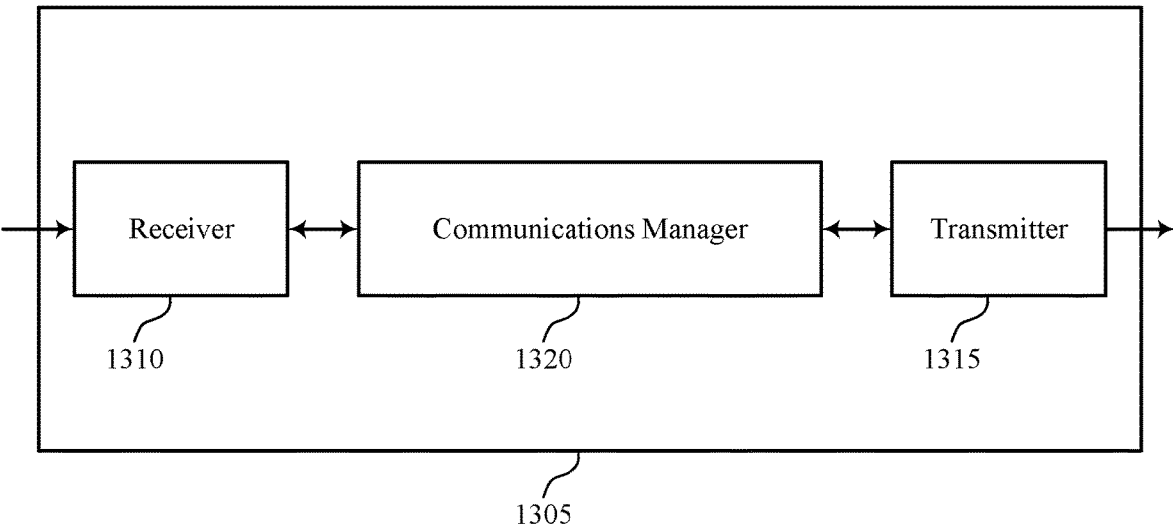
FIGS. 13 and 14 illustrate block diagrams of devices that support tone reservation techniques for OTFS waveform communications in accordance with one or more aspects of the present disclosure.

FIG. 13 illustrates a block diagram 1300 of a device 1305 that supports tone reservation techniques for OTFS waveform communications in accordance with one or more aspects of the present disclosure. The device 1305 may be an example of aspects of a UE 115 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to tone reservation techniques for OTFS waveform communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to tone reservation techniques for OTFS waveform communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of tone reservation techniques for OTFS waveform communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a transmitting device in accordance with examples as disclosed herein. For example, the communications manager 1320 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 1320 may be configured as or otherwise support a means for generating an information signal for transmission via a second subset of resources of the set of multiple resources for the OTFS frame, the information signal including information bits modulated according to an OTFS waveform. The communications manager 1320 may be configured as or otherwise support a means for transmitting, to the receiving device, the tone reservation signal via the first subset of resources and the information signal via the second subset of resources.

Additionally, or alternatively, the communications manager 1320 may support wireless communication at a receiving device in accordance with examples as disclosed herein. For example, the communications manager 1320 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 1320 may be configured as or otherwise support a means for decoding the information signal from the second subset of resources based on the second subset of resources and the OTFS waveform.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for for tone reservation in communications using OTFS frames to mitigate relatively high PAPR, which may provide for more efficient utilization of communication resources and reduced processing power.

Figure 14:
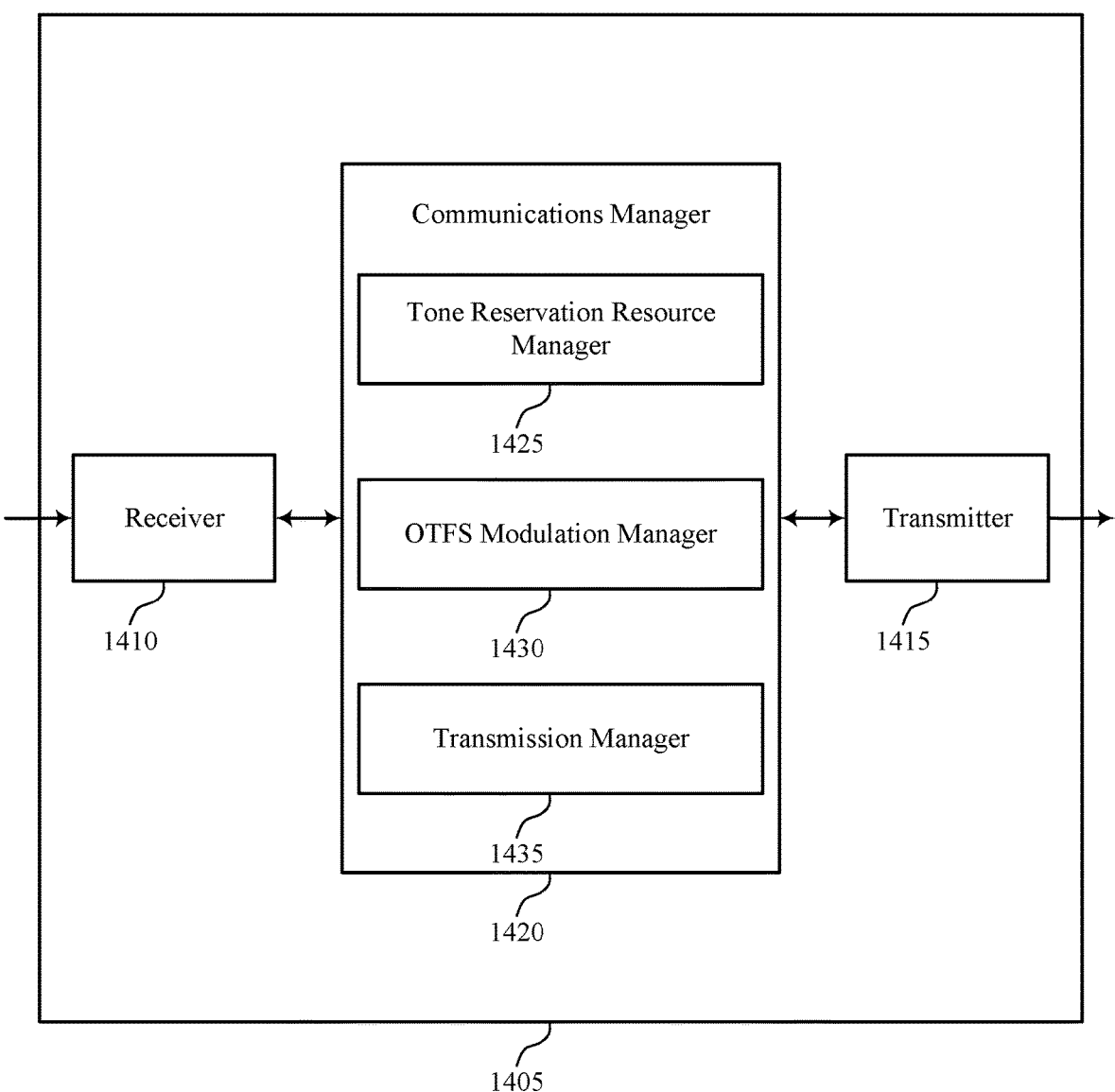

FIG. 14 illustrates a block diagram 1400 of a device 1405 that supports tone reservation techniques for OTFS waveform communications in accordance with one or more aspects of the present disclosure. The device 1405 may be an example of aspects of a device 1305, a UE 115, or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to tone reservation techniques for OTFS waveform communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to tone reservation techniques for OTFS waveform communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of tone reservation techniques for OTFS waveform communications as described herein. For example, the communications manager 1420 may include a tone reservation resource manager 1425, an OTFS modulation manager 1430, a transmission manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a transmitting device in accordance with examples as disclosed herein. The tone reservation resource manager 1425 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The OTFS modulation manager 1430 may be configured as or otherwise support a means for generating an information signal for transmission via a second subset of resources of the set of multiple resources for the OTFS frame, the information signal including information bits modulated according to an OTFS waveform. The transmission manager 1435 may be configured as or otherwise support a means for transmitting, to the receiving device, the tone reservation signal via the first subset of resources and the information signal via the second subset of resources.

Additionally, or alternatively, the communications manager 1420 may support wireless communication at a receiving device in accordance with examples as disclosed herein. The OTFS modulation manager 1430 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The tone reservation resource manager 1425 may be configured as or otherwise support a means for decoding the information signal from the second subset of resources based on the second subset of resources and the OTFS waveform.

Figure 15:
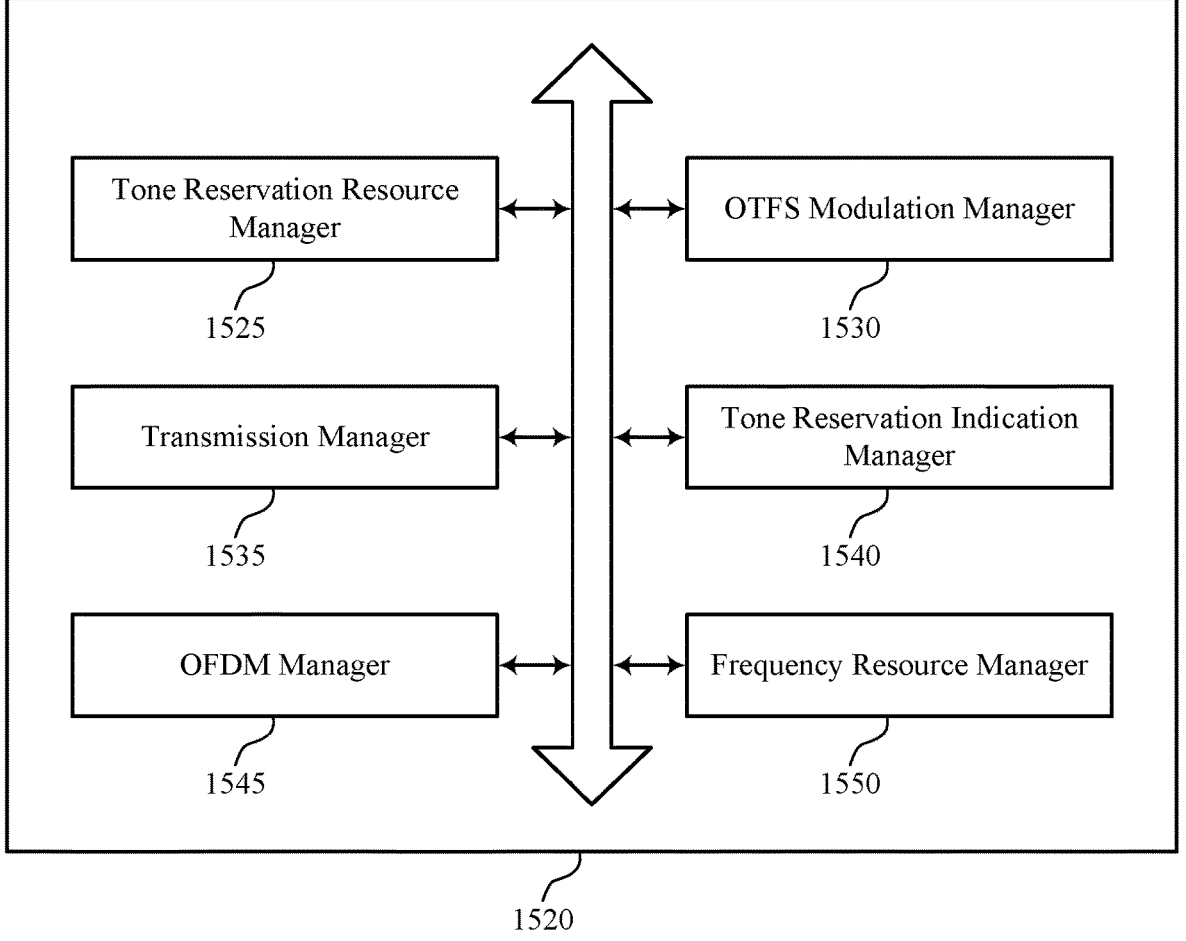
FIG. 15 illustrates a block diagram of a communications manager that supports tone reservation techniques for OTFS waveform communications in accordance with one or more aspects of the present disclosure.

FIG. 15 illustrates a block diagram 1500 of a communications manager 1520 that supports tone reservation techniques for OTFS waveform communications in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of tone reservation techniques for OTFS waveform communications as described herein. For example, the communications manager 1520 may include a tone reservation resource manager 1525, an OTFS modulation manager 1530, a transmission manager 1535, a tone reservation indication manager 1540, an OFDM manager 1545, a frequency resource manager 1550, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a transmitting device in accordance with examples as disclosed herein. The tone reservation resource manager 1525 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The OTFS modulation manager 1530 may be configured as or otherwise support a means for generating an information signal for transmission via a second subset of resources of the set of multiple resources for the OTFS frame, the information signal including information bits modulated according to an OTFS waveform. The transmission manager 1535 may be configured as or otherwise support a means for transmitting, to the receiving device, the tone reservation signal via the first subset of resources and the information signal via the second subset of resources.

In some examples, integration of the tone reservation signal via the first subset of resources provides a reduced peak to average power ratio (PAPR) relative to a PAPR of the information signal using the OTFS frame that occupies all resources of the set of multiple resources. In some examples, the first subset of resources include a first subset of delay-Doppler symbols in the delay-Doppler resource grid.

In some examples, to support generating the tone reservation signal, the tone reservation resource manager 1525 may be configured as or otherwise support a means for selecting a set of multiple delay-Doppler symbols in the delay-Doppler resource grid as tone reservation symbols, where the tone reservation symbols in the delay-Doppler resource grid are transformed into time resources and frequency resources for transmission to the receiving device. In some examples, the tone reservation symbols are selected as one Doppler location for each delay location of the delay-Doppler resource grid, more than one Doppler location for each delay location of the delay-Doppler resource grid, or less than one Doppler location for each delay location of the delay-Doppler resource grid. In some examples, the Doppler location of the tone reservation symbols is a same Doppler location for each delay location of the delay-Doppler resource grid. In some examples, the Doppler location of the tone reservation symbols is a different Doppler location for one or more different delay locations of the delay-Doppler resource grid.

In some examples, the first subset of resources are out-of-frame resources that occupy one or more resources outside of the OTFS frame. In some examples, the one or more resources correspond to one or more subcarriers of a set of multiple subcarriers associated with the OTFS frame, the first subset of resources correspond to a first subset of subcarriers, and the second subset of resources correspond to a second subset of subcarriers, and where the first subset of subcarriers are higher frequency subcarriers than the second subset of subcarriers, are lower frequency subcarriers than the second subset of subcarriers, or any combinations thereof. In some examples, the second subset of subcarriers are divided into two or more separate frequency allocations to provide two or more separate OTFS frames, and one or more subcarriers of the first subset of subcarriers are located between the two or more separate frequency allocations.

In some examples, to support generating the tone reservation signal, the tone reservation resource manager 1525 may be configured as or otherwise support a means for determining a tone reservation pattern and a quantity of resources associated with the tone reservation signal based on one or more channel measurements of a channel between the transmitting device and the receiving device. In some examples, to support generating the tone reservation signal, the tone reservation indication manager 1540 may be configured as or otherwise support a means for transmitting an indication of the tone reservation pattern and the quantity of resources associated with the tone reservation signal to the receiving device. In some examples, the indication of the tone reservation pattern and the quantity of resources associated with the tone reservation signal is provided via one or more of a control signaling communication, an RRC communication, a MAC control element, or any combinations thereof. In some examples, the indication of the tone reservation pattern and the quantity of resources associated with the tone reservation signal includes an index value of a set of multiple index values that are mapped to different tone reservation patterns and quantities of resources. In some examples, the tone reservation signal includes a guard area to provide for interference mitigation between the tone reservation signal and the information signal.

Additionally, or alternatively, the communications manager 1520 may support wireless communication at a receiving device in accordance with examples as disclosed herein. In some examples, the OTFS modulation manager 1530 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. In some examples, the tone reservation resource manager 1525 may be configured as or otherwise support a means for decoding the information signal from the second subset of resources based on the second subset of resources and the OTFS waveform. In some examples, the first subset of resources include a first subset of delay-Doppler symbols in the delay-Doppler resource grid.

In some examples, to support decoding the information signal, the OFDM manager 1545 may be configured as or otherwise support a means for transforming a first set of received orthogonal frequency division multiplexing (OFDM) modulation symbols in a time-frequency resource grid into a second set of delay-Doppler symbols in the delay-Doppler resource grid. In some examples, to support decoding the information signal, the tone reservation resource manager 1525 may be configured as or otherwise support a means for determining a subset of delay-Doppler symbols of the second set of delay-Doppler symbols that are tone reservation symbols. In some examples, to support decoding the information signal, the tone reservation resource manager 1525 may be configured as or otherwise support a means for discarding the tone reservation symbols from the second set of delay-Doppler symbols to obtain a set of information symbols. In some examples, to support decoding the information signal, the OTFS modulation manager 1530 may be configured as or otherwise support a means for decoding the set of information symbols based on the OTFS waveform. In some examples, the tone reservation symbols are provided as one Doppler location for each delay location of the delay-Doppler resource grid, more than one Doppler location for each delay location of the delay-Doppler resource grid, or less than one Doppler location for each delay location of the delay-Doppler resource grid. In some examples, the first subset of resources are out-of-frame resources that occupy one or more resources outside of the OTFS frame.

In some examples, the tone reservation indication manager 1540 may be configured as or otherwise support a means for receiving, from the transmitting device, an indication of a tone reservation pattern and a quantity of resources associated with the tone reservation signal. In some examples, the indication of the tone reservation pattern and the quantity of resources associated with the tone reservation signal is provided via one or more of a control signaling communication, an RRC communication, a MAC control element, or any combinations thereof. In some examples, the indication of the tone reservation pattern and the quantity of resources associated with the tone reservation signal includes an index value of a set of multiple index values that are mapped to different tone reservation patterns and quantities of resources.

Figure 16:
FIG. 16 illustrates a diagram of a system including a UE that supports tone reservation techniques for OTFS waveform communications in accordance with one or more aspects of the present disclosure.

FIG. 16 illustrates a diagram of a system 1600 including a device 1605 that supports tone reservation techniques for OTFS waveform communications in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include random access memory (RAM) and read-only memory (ROM). The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a basic input/output (I/O) system (BIOS) which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting tone reservation techniques for OTFS waveform communications). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a transmitting device in accordance with examples as disclosed herein. For example, the communications manager 1620 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 1620 may be configured as or otherwise support a means for generating an information signal for transmission via a second subset of resources of the set of multiple resources for the OTFS frame, the information signal including information bits modulated according to an OTFS waveform. The communications manager 1620 may be configured as or otherwise support a means for transmitting, to the receiving device, the tone reservation signal via the first subset of resources and the information signal via the second subset of resources.

Additionally, or alternatively, the communications manager 1620 may support wireless communication at a receiving device in accordance with examples as disclosed herein. For example, the communications manager 1620 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 1620 may be configured as or otherwise support a means for decoding the information signal from the second subset of resources based on the second subset of resources and the OTFS waveform.

By including or configuring the communications manager 1620 in accordance with examples as described herein, the device 1605 may support techniques for tone reservation in communications using OTFS frames to mitigate relatively high PAPR, which may provide for more efficient utilization of communication resources, reduced processing power, improved communication reliability, and improved user experience related to reduced processing, reduced power consumption, more efficient utilization of communication resources.

In some examples, the communications manager 1620 may be configured to perform various operations (e.g., receiving, obtaining, monitoring, outputting, transmitting)

using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of tone reservation techniques for OTFS waveform communications as described herein, or the processor 1635 and the memory 1625 may be otherwise configured to perform or support such operations.

Figure 17:
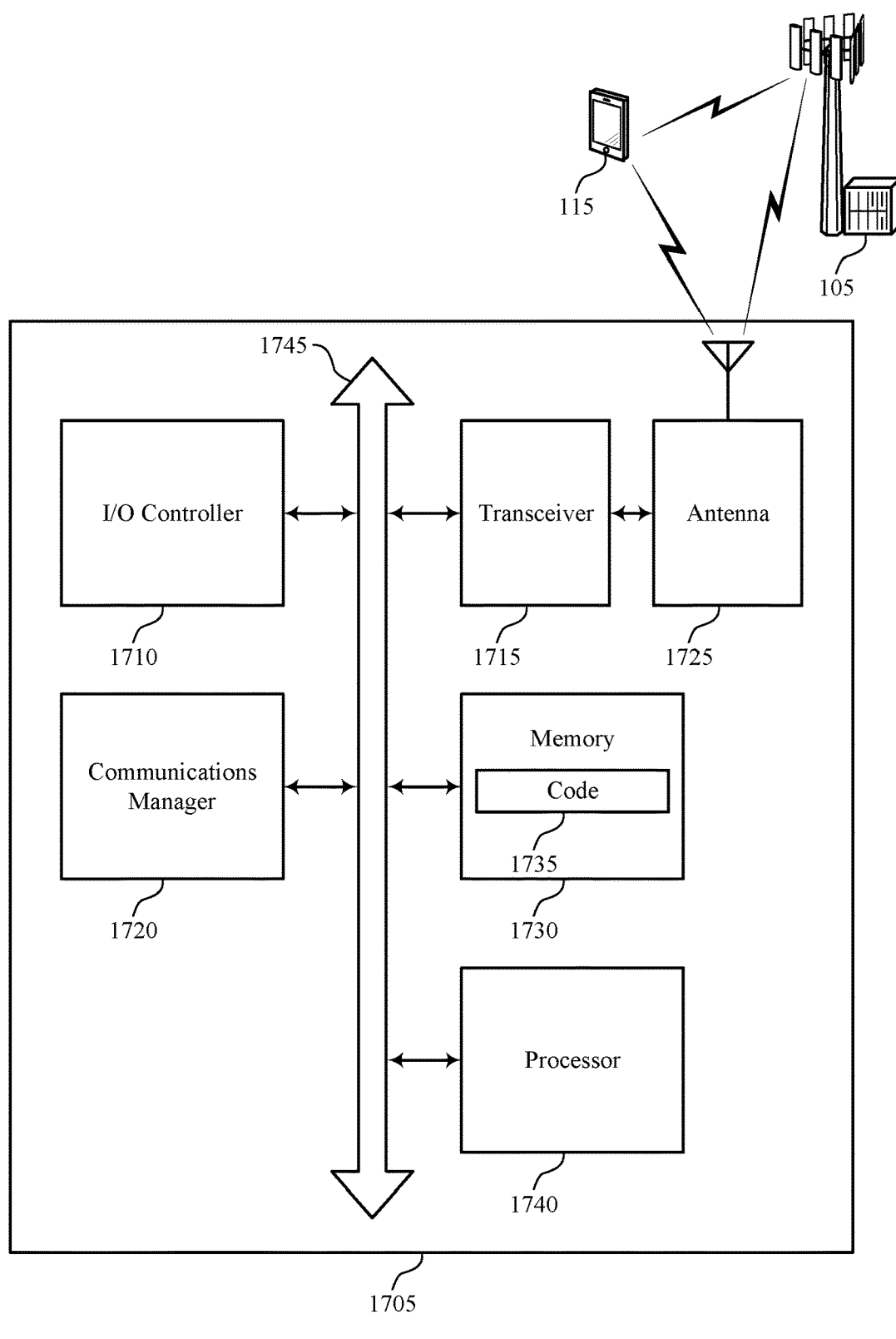
FIG. 17 illustrates a diagram of a system including a network entity that supports tone reservation techniques for OTFS waveform communications in accordance with one or more aspects of the present disclosure.

FIG. 17 illustrates a diagram of a system 1700 including a device 1705 that supports tone reservation techniques for OTFS waveform communications in accordance with one or more aspects of the present disclosure. The device 1705 may be an example of or include the components of a device 1305, a device 1405, or a UE 115 as described herein. The device 1705 may communicate (e.g., wirelessly) with one or more network entities 105, one or more UEs 115, or any combination thereof. The device 1705 may include components for bi-directional voice and data communications including components for transmitting and receiving communications, such as a communications manager 1720, an I/O controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1315, a transmitter 1415, a receiver 1310, a receiver 1410, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting tone reservation techniques for OTFS waveform communications). For example, the device 1705 or a component of the device 1705 may include a processor 1740 and memory 1730 coupled with or to the processor 1740, the processor 1740 and memory 1730 configured to perform various functions described herein.

The communications manager 1720 may support wireless communication at a transmitting device in accordance with examples as disclosed herein. For example, the communications manager 1720 may be configured as or otherwise support a means for generating a tone reservation signal for transmission via a first subset of resources of a set of multiple resources associated with an OTFS frame, the set of multiple resources spanning a delay-Doppler resource grid associated with the OTFS frame for communications between the transmitting device and a receiving device. The communications manager 1720 may be configured as or otherwise support a means for generating an information signal for transmission via a second subset of resources of the set of multiple resources for the OTFS frame, the information signal including information bits modulated according to an OTFS waveform. The communications manager 1720 may be configured as or otherwise support a means for transmitting, to the receiving device, the tone reservation signal via the first subset of resources and the information signal via the second subset of resources.

Additionally, or alternatively, the communications manager 1720 may support wireless communication at a receiving device in accordance with examples as disclosed herein. For example, the communications manager 1720 may be configured as or otherwise support a means for receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The communications manager 1720 may be configured as or otherwise support a means for decoding the information signal from the second subset of resources based on the second subset of resources and the OTFS waveform.

By including or configuring the communications manager 1720 in accordance with examples as described herein, the device 1705 may support techniques for tone reservation in communications using OTFS frames to mitigate relatively high PAPR, which may provide for more efficient utilization of communication resources, reduced processing power, improved communication reliability, and improved user experience related to reduced processing, reduced power consumption, more efficient utilization of communication resources.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of tone reservation techniques for OTFS waveform communications as described herein, or the processor 1740 and the memory 1730 may be otherwise configured to perform or support such operations.

FIG. 18 illustrates a flowchart showing a method 1800 that supports tone reservation techniques for OTFS waveform communications in accordance with one or more aspects of the present disclosure. The operations of the method 1800 may be implemented by a UE or a network entity or its components as described herein. For example, the operations of the method 1800 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include generating an information signal for transmission via a second subset of resources of a set of multiple resources for an OTFS frame, the information signal including information bits modulated according to an OTFS waveform, and the set of multiple resources spanning a delay-Doppler resource grid associated with the OTFS frame for communications between the transmitting device and a receiving device. The operations of 1810 may be performed in accordance with examples as disclosed herein. In some examples, aspects of the operations of 1810 may be performed by an OTFS modulation manager 1030 as described with reference to FIG. 10.

At 1810, the method may include generating a tone reservation signal for transmission via a first subset of resources of the set of multiple resources associated with the OTFS frame. The operations of 1810 may be performed in accordance with examples as disclosed herein. In some examples, aspects of the operations of 1810 may be performed by a tone reservation resource manager 1025 as described with reference to FIG. 10.

At 1815, the method may include transmitting, to the receiving device, the tone reservation signal via the first subset of resources and the information signal via the second subset of resources. The operations of 1815 may be performed in accordance with examples as disclosed herein. In some examples, aspects of the operations of 1815 may be performed by a transmission manager 1035 as described with reference to FIG. 10.

FIG. 19 illustrates a flowchart showing a method 1900 that supports tone reservation techniques for OTFS waveform communications in accordance with one or more aspects of the present disclosure. The operations of the method 1900 may be implemented by a UE or a network entity or its components as described herein. For example, the operations of the method 1900 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1905, the method may include generating an information signal for transmission via a second subset of resources of a set of multiple resources for an OTFS frame, the information signal including information bits modulated according to an OTFS waveform, and the set of multiple resources spanning a delay-Doppler resource grid associated with the OTFS frame for communications between the transmitting device and a receiving device. The operations of 1905 may be performed in accordance with examples as disclosed herein. In some examples, aspects of the operations of 1905 may be performed by an OTFS modulation manager 1030 as described with reference to FIG. 10.

At 1910, the method may include generating a tone reservation signal for transmission via a first subset of resources of the set of multiple resources associated with the OTFS frame. The operations of 1910 may be performed in accordance with examples as disclosed herein. In some examples, aspects of the operations of 1910 may be performed by a tone reservation resource manager 1025 as described with reference to FIG. 10.

At 1915, the method may include selecting a set of multiple delay-Doppler symbols in the delay-Doppler resource grid as tone reservation symbols, where the tone reservation symbols in the delay-Doppler resource grid are transformed into time resources and frequency resources for transmission to the receiving device. The operations of 1915 may be performed in accordance with examples as disclosed herein. In some examples, aspects of the operations of 1915 may be performed by a tone reservation resource manager 1025 as described with reference to FIG. 10. In some cases, based on the data signal, a desired tone reservation signal may be generated and the resources selected for the tone reservation signal based on the tone reservation signal, where the resource selection may be performed in an iterative manner based on a PAPR of the overall signal with the tone reservation resources. For example, in some cases, due to limited resources that may be used for tone reservation, the tone reservation symbols may not align exactly with the desired tone reservation signal, and selection of tone reservation symbols may be iterative based on an expected PAPR of different options for the selection of tone reservation symbols.

At 1920, the method may include transmitting, to the receiving device, the tone reservation signal via the first subset of resources and the information signal via the second subset of resources. The operations of 1920 may be performed in accordance with examples as disclosed herein. In some examples, aspects of the operations of 1920 may be performed by a transmission manager 1035 as described with reference to FIG. 10.

Figure 20:
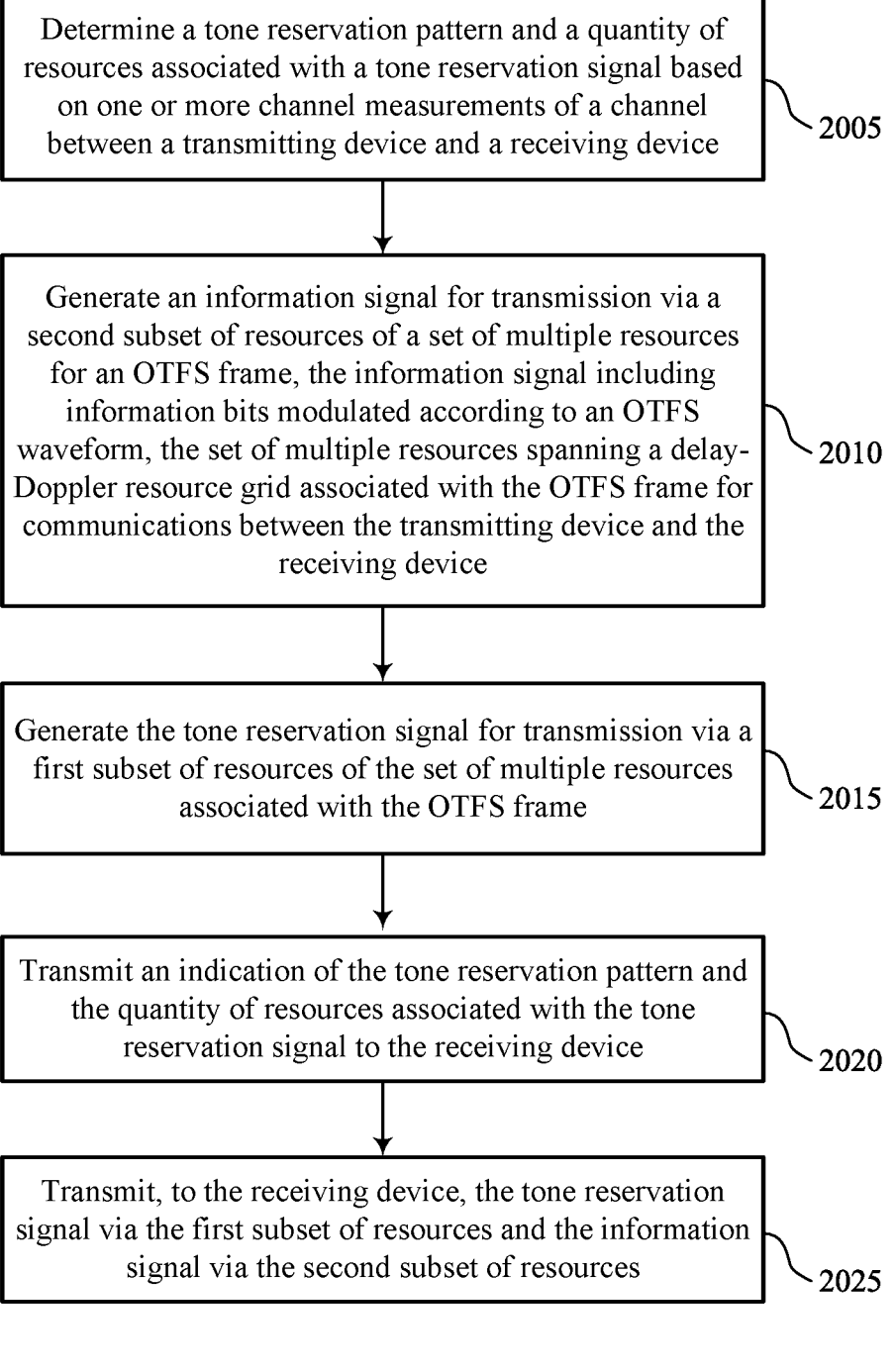

FIG. 20 illustrates a flowchart showing a method 2000 that supports tone reservation techniques for OTFS waveform communications in accordance with one or more aspects of the present disclosure. The operations of the method 2000 may be implemented by a UE or a network entity or its components as described herein. For example, the operations of the method 2000 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2005, the method may include determining a tone reservation pattern and a quantity of resources associated with a tone reservation signal based on one or more channel measurements of a channel between a transmitting device and a receiving device. The operations of 2005 may be performed in accordance with examples as disclosed herein. In some examples, aspects of the operations of 2005 may be performed by a tone reservation resource manager 1025 as described with reference to FIG. 10.

At 2010, the method may include generating an information signal for transmission via a second subset of resources of a set of multiple resources for an OTFS frame, the information signal including information bits modulated according to an OTFS waveform, and the set of multiple resources spanning a delay-Doppler resource grid associated with the OTFS frame for communications between the transmitting device and the receiving device. The operations of 2010 may be performed in accordance with examples as disclosed herein. In some examples, aspects of the operations of 2010 may be performed by an OTFS modulation manager 1030 as described with reference to FIG. 10.

At 2015, the method may include generating the tone reservation signal for transmission via a first subset of resources of the set of multiple resources associated with the OTFS frame. The operations of 2015 may be performed in accordance with examples as disclosed herein. In some examples, aspects of the operations of 2015 may be performed by a tone reservation resource manager 1025 as described with reference to FIG. 10. In some cases, based on the data signal, a desired tone reservation signal may be generated and resources selected for the tone reservation signal based on the tone reservation signal, where the resource selection may be performed in an iterative manner based on a PAPR of the overall signal with the tone reservation resources. For example, in some cases, due to limited resources that may be used for tone reservation, the tone reservation symbols may not align exactly with the desired tone reservation signal, and selection of tone reservation symbols may be iterative based on an expected PAPR of different options for the selection of tone reservation symbols.

At 2020, the method may include transmitting an indication of the tone reservation pattern and the quantity of resources associated with the tone reservation signal to the receiving device. The operations of 2020 may be performed in accordance with examples as disclosed herein. In some examples, aspects of the operations of 2020 may be performed by a tone reservation indication manager 1040 as described with reference to FIG. 10.

At 2025, the method may include transmitting, to the receiving device, the tone reservation signal via the first subset of resources and the information signal via the second subset of resources. The operations of 2025 may be performed in accordance with examples as disclosed herein. In some examples, aspects of the operations of 2025 may be performed by a transmission manager 1035 as described with reference to FIG. 10.

FIG. 21 illustrates a flowchart showing a method 2100 that supports tone reservation techniques for OTFS waveform communications in accordance with one or more aspects of the present disclosure. The operations of the method 2100 may be implemented by a network entity or a UE or its components as described herein. For example, the operations of the method 2100 may be performed by a network entity or a UE 115 as described with reference to FIGS. 1 through 7 and 13 through 17. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 2105, the method may include receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The operations of 2105 may be performed in accordance with examples as disclosed herein. In some examples, aspects of the operations of 2105 may be performed by an OTFS modulation manager 1530 as described with reference to FIG. 15.

At 2110, the method may include decoding the information signal from the second subset of resources based on the second subset of resources and the OTFS waveform. The operations of 2110 may be performed in accordance with examples as disclosed herein. In some examples, aspects of the operations of 2110 may be performed by a tone reservation resource manager 1525 as described with reference to FIG. 15.

FIG. 22 illustrates a flowchart showing a method 2200 that supports tone reservation techniques for OTFS waveform communications in accordance with one or more aspects of the present disclosure. The operations of the method 2200 may be implemented by a network entity or a UE or its components as described herein. For example, the operations of the method 2200 may be performed by a network entity or a UE 115 as described with reference to FIGS. 1 through 7 and 13 through 17. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 2205, the method may include receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The operations of 2205 may be performed in accordance with examples as disclosed herein. In some examples, aspects of the operations of 2205 may be performed by an OTFS modulation manager 1530 as described with reference to FIG. 15.

At 2210, the method may include transforming a first set of received orthogonal frequency division multiplexing (OFDM) modulation symbols in a time-frequency resource grid into a second set of delay-Doppler symbols in the delay-Doppler resource grid. The operations of 2210 may be performed in accordance with examples as disclosed herein. In some examples, aspects of the operations of 2210 may be performed by an OFDM manager 1545 as described with reference to FIG. 15.

At 2215, the method may include determining a subset of delay-Doppler symbols of the second set of delay-Doppler symbols that are tone reservation symbols. The operations of 2215 may be performed in accordance with examples as disclosed herein. In some examples, aspects of the operations of 2215 may be performed by a tone reservation resource manager 1525 as described with reference to FIG. 15.

At 2220, the method may include discarding the tone reservation symbols (and also guard symbols, if allocated) from the second set of delay-Doppler symbols to obtain a set of information symbols. The operations of 2220 may be performed in accordance with examples as disclosed herein. In some examples, aspects of the operations of 2220 may be performed by a tone reservation resource manager 1525 as described with reference to FIG. 15.

At 2225, the method may include decoding the set of information symbols based on the OTFS waveform. The operations of 2225 may be performed in accordance with examples as disclosed herein. In some examples, aspects of the operations of 2225 may be performed by an OTFS modulation manager 1530 as described with reference to FIG. 15.

FIG. 23 illustrates a flowchart showing a method 2300 that supports tone reservation techniques for OTFS waveform communications in accordance with one or more aspects of the present disclosure. The operations of the method 2300 may be implemented by a network entity or a UE or its components as described herein. For example, the operations of the method 2300 may be performed by a network entity or a UE 115 as described with reference to FIGS. 1 through 7 and 13 through 17. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 2305, the method may include receiving, from a transmitting device, an OTFS frame via a set of resources that span a delay-Doppler resource grid associated with the OTFS frame, where a first subset of the set of resources provide a tone reservation signal and a second subset of resources of the set of resources provide an information signal including information bits modulated according to an OTFS waveform. The operations of 2305 may be performed in accordance with examples as disclosed herein. In some examples, aspects of the operations of 2305 may be performed by an OTFS modulation manager 1530 as described with reference to FIG. 15.

At 2310, the method may include receiving, from the transmitting device, an indication of a tone reservation pattern and a quantity of resources associated with the tone reservation signal. The operations of 2310 may be performed in accordance with examples as disclosed herein. In some examples, aspects of the operations of 2310 may be performed by a tone reservation indication manager 1540 as described with reference to FIG. 15.

At 2315, the method may include decoding the information signal from the second subset of resources based on the second subset of resources and the OTFS waveform. The operations of 2315 may be performed in accordance with examples as disclosed herein. In some examples, aspects of the operations of 2315 may be performed by a tone reservation resource manager 1525 as described with reference to FIG. 15.

The following provides an overview of aspects of the present disclosure:

Aspect 1: A method for wireless communication at a transmitting device, comprising: generating a tone reservation signal for transmission via a first subset of resources of a plurality of resources associated with an orthogonal time-frequency space (OTFS) frame, the plurality of resources spanning a delay-Doppler resource grid associated with the OTFS frame for communications between the transmitting device and a receiving device; generating an information signal for transmission via a second subset of resources of the plurality of resources for the OTFS frame, the information signal including information bits modulated according to an OTFS waveform; and transmitting, to the receiving device, the tone reservation signal via the first subset of resources and the information signal via the second subset of resources.

Aspect 2: The method of aspect 1, wherein integration of the tone reservation signal via the first subset of resources provides a reduced peak to average power ratio (PAPR) relative to a PAPR of the information signal using the OTFS frame that occupies all resources of the plurality of resources.

Aspect 3: The method of any of aspects 1 through 2, wherein the first subset of resources comprise a first subset of delay-Doppler symbols in the delay-Doppler resource grid.

Aspect 4: The method of any of aspects 1 through 3, wherein the generating the tone reservation signal comprises: selecting a plurality of delay-Doppler symbols in the delay-Doppler resource grid as tone reservation symbols, wherein the tone reservation symbols in the delay-Doppler resource grid are transformed into time resources and frequency resources for transmission to the receiving device.

Aspect 5: The method of aspect 4, wherein the tone reservation symbols are selected as one Doppler location for each delay location of the delay-Doppler resource grid.

Aspect 6: The method of aspect 5, wherein the Doppler location of the tone reservation symbols is a same Doppler location for each delay location of the delay-Doppler resource grid.

Aspect 7: The method of any of aspect 5, wherein the Doppler location of the tone reservation symbols is a different Doppler location for one or more different delay locations of the delay-Doppler resource grid.

Aspect 8: The method of any of aspects 1 through 7, wherein the first subset of resources are out-of-frame resources that occupy one or more resources outside of the OTFS frame.

Aspect 9: The method of aspect 8, wherein the one or more resources correspond to one or more subcarriers of a plurality of subcarriers associated with the OTFS frame, the first subset of resources correspond to a first subset of subcarriers, and the second subset of resources correspond to a second subset of subcarriers, and wherein the first subset of subcarriers are higher frequency subcarriers than the second subset of subcarriers, are lower frequency subcarriers than the second subset of subcarriers, or any combinations thereof.

Aspect 10: The method of aspect 9, wherein the second subset of subcarriers are divided into two or more separate frequency allocations to provide two or more separate OTFS frames, and one or more subcarriers of the first subset of subcarriers are located between the two or more separate frequency allocations.

Aspect 11: The method of any of aspects 1 through 10, wherein the generating the tone reservation signal comprises: determining a tone reservation pattern and a quantity of resources associated with the tone reservation signal based at least in part on one or more channel measurements of a channel between the transmitting device and the receiving device; and transmitting an indication of the tone reservation pattern and the quantity of resources associated with the tone reservation signal to the receiving device.

Aspect 12: The method of aspect 11, wherein the indication of the tone reservation pattern and the quantity of resources associated with the tone reservation signal is provided via one or more of a control signaling communication, an RRC communication, a medium access control (MAC) control element, or any combinations thereof.

Aspect 13: The method of any of aspects 11 through 12, wherein the indication of the tone reservation pattern and the quantity of resources associated with the tone reservation signal includes an index value of a plurality of index values that are mapped to different tone reservation patterns and quantities of resources.

Aspect 14: The method of any of aspects 1 through 13, wherein the tone reservation signal includes a guard area to provide for interference mitigation between the tone reservation signal and the information signal.

Aspect 15: A method for wireless communication at a receiving device, comprising: receiving, from a transmitting device, an orthogonal time-frequency space (OTFS) frame via a set of resources that span a delay-Doppler resource grid associated with the OTFS frame, wherein a first subset of the set of resources provide a tone reservation signal and a second subset of resources of the set of resources provide an information signal including information bits modulated according to an OTFS waveform; and decoding the information signal from the second subset of resources based at least in part on the second subset of resources and the OTFS waveform.

Aspect 16: The method of aspect 15, wherein the first subset of resources comprise a first subset of delay-Doppler symbols in the delay-Doppler resource grid.

Aspect 17: The method of any of aspects 15 through 16, wherein the decoding the information signal comprises: transforming a first set of received orthogonal frequency division multiplexing (OFDM) modulation symbols in a time-frequency resource grid into a second set of delay-Doppler symbols in the delay-Doppler resource grid; determining a subset of delay-Doppler symbols of the second set of delay-Doppler symbols that are tone reservation symbols; discarding the tone reservation symbols from the second set of delay-Doppler symbols to obtain a set of information symbols; and decoding the set of information symbols based at least in part on the OTFS waveform.

Aspect 18: The method of aspect 17, wherein the tone reservation symbols are provided as one Doppler location for each delay location of the delay-Doppler resource grid.

Aspect 19: The method of any of aspects 15 through 18, wherein the first subset of resources are out-of-frame resources that occupy one or more resources outside of the OTFS frame.

Aspect 20: The method of any of aspects 15 through 19, further comprising: receiving, from the transmitting device, an indication of a tone reservation pattern and a quantity of resources associated with the tone reservation signal.

Aspect 21: The method of aspect 20, wherein the indication of the tone reservation pattern and the quantity of resources associated with the tone reservation signal is provided via one or more of a control signaling communication, an RRC communication, a medium access control (MAC) control element, or any combinations thereof.

Aspect 22: The method of any of aspects 20 through 21, wherein the indication of the tone reservation pattern and the quantity of resources associated with the tone reservation signal includes an index value of a plurality of index values that are mapped to different tone reservation patterns and quantities of resources.

Aspect 23: An apparatus for wireless communication at a transmitting device, comprising a processor; memory coupled with the processor; and instructions stored in the memory and executable by the processor to cause the apparatus to perform a method of any of aspects 1 through 14.

Aspect 24: An apparatus for wireless communication at a transmitting device, comprising at least one means for performing a method of any of aspects 1 through 14.

Aspect 25: A non-transitory computer-readable medium storing code for wireless communication at a transmitting device, the code comprising instructions executable by a processor to perform a method of any of aspects 1 through 14.

Aspect 26: An apparatus for wireless communication at a receiving device, comprising a processor; memory coupled with the processor; and instructions stored in the memory and executable by the processor to cause the apparatus to perform a method of any of aspects 15 through 22.

Aspect 27: An apparatus for wireless communication at a receiving device, comprising at least one means for performing a method of any of aspects 15 through 22.

Aspect 28: A non-transitory computer-readable medium storing code for wireless communication at a receiving device, the code comprising instructions executable by a processor to perform a method of any of aspects 15 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method for wireless communication at a transmitting device, comprising:
generating an orthogonal time-frequency space (OTFS) tone reservation signal for transmission via a first subset of resources of a plurality of resources of an OTFS frame, the plurality of resources spanning a delay-Doppler resource grid associated with the OTFS frame for communications between the transmitting device and a receiving device;
generating an information signal for transmission via a second subset of resources of the plurality of resources for the OTFS frame, the information signal including information bits modulated according to an OTFS waveform; and transmitting, to the receiving device, the OTFS tone reservation signal via the first subset of resources and the information signal via the second subset of resources.

2. The method of claim 1, wherein integration of the OTFS tone reservation signal via the first subset of resources provides a reduced peak to average power ratio (PAPR) relative to a PAPR of the information signal using the OTFS frame that occupies all resources of the plurality of resources.

3. The method of claim 1, wherein the first subset of resources comprise a first subset of delay-Doppler symbols in the delay-Doppler resource grid.

4. The method of claim 1, wherein the generating the OTFS tone reservation signal comprises:

selecting a plurality of delay-Doppler symbols in the delay-Doppler resource grid as tone reservation symbols, wherein the tone reservation symbols in the delay-Doppler resource grid are transformed into time resources and frequency resources for transmission to the receiving device.

5. The method of claim 4, wherein the tone reservation symbols are selected as one Doppler location for each delay location of the delay-Doppler resource grid, more than one Doppler location for each delay location of the delay-Doppler resource grid, or less than one Doppler location for each delay location of the delay-Doppler resource grid.

6. The method of claim 5, wherein the Doppler location of the tone reservation symbols is a same Doppler location for each delay location of the delay-Doppler resource grid.

7. The method of claim 5, wherein the Doppler location of the tone reservation symbols is a different Doppler location for one or more different delay locations of the delay-Doppler resource grid.

8. The method of claim 1, wherein the first subset of resources are out-of-frame resources that occupy one or more resources outside of the OTFS frame.

9. The method of claim 8, wherein the one or more resources correspond to one or more subcarriers of a plurality of subcarriers associated with the OTFS frame, the first subset of resources correspond to a first subset of subcarriers, and the second subset of resources correspond to a second subset of subcarriers, and wherein the first subset of subcarriers are higher frequency subcarriers than the second subset of subcarriers, are lower frequency subcarriers than the second subset of subcarriers, or any combinations thereof.

10. The method of claim 9, wherein the second subset of subcarriers are divided into two or more separate frequency allocations to provide two or more separate OTFS frames, and one or more subcarriers of the first subset of subcarriers are located between the two or more separate frequency allocations.

11. The method of claim 1, wherein the generating the OTFS tone reservation signal comprises:

determining a tone reservation pattern and a quantity of resources associated with the OTFS tone reservation signal based at least in part on one or more channel measurements of a channel between the transmitting device and the receiving device; and transmitting an indication of the tone reservation pattern and the quantity of resources associated with the OTFS tone reservation signal to the receiving device.

12. The method of claim 11, wherein the indication of the tone reservation pattern and the quantity of resources associated with the OTFS tone reservation signal is provided via one or more of a control signaling communication, a radio resource control (RRC) communication, a medium access control (MAC) control element, or any combinations thereof.

13. The method of claim 11, wherein the indication of the tone reservation pattern and the quantity of resources associated with the OTFS tone reservation signal includes an index value of a plurality of index values that are mapped to different tone reservation patterns and quantities of resources.

14. The method of claim 1, wherein the OTFS tone reservation signal includes a guard area to provide for interference mitigation between the OTFS tone reservation signal and the information signal.

15. A method for wireless communication at a receiving device, comprising:

receiving, from a transmitting device, an orthogonal time-frequency space (OTFS) frame via a set of resources that span a delay-Doppler resource grid associated with the OTFS frame, wherein a first subset of the set of resources provide an OTFS tone reservation signal and a second subset of resources of the set of resources provide an information signal including information bits modulated according to an OTFS waveform; and decoding the information signal from the second subset of resources based at least in part on the second subset of resources and the OTFS waveform.

16. The method of claim 15, wherein the first subset of resources comprise a first subset of delay-Doppler symbols in the delay-Doppler resource grid.

17. The method of claim 15, wherein the decoding the information signal comprises:

transforming a first set of received orthogonal frequency division multiplexing (OFDM) modulation symbols in a time-frequency resource grid into a second set of delay-Doppler symbols in the delay-Doppler resource grid;

determining a subset of delay-Doppler symbols of the second set of delay-Doppler symbols that are tone reservation symbols;

discarding the tone reservation symbols from the second set of delay-Doppler symbols to obtain a set of information symbols; and decoding the set of information symbols based at least in part on the OTFS waveform.

18. The method of claim 17, wherein the tone reservation symbols are provided as one Doppler location for each delay location of the delay-Doppler resource grid, more than one Doppler location for each delay location of the delay-Doppler resource grid, or less than one Doppler location for each delay location of the delay-Doppler resource grid.

19. The method of claim 15, wherein the first subset of resources are out-of-frame resources that occupy one or more resources outside of the OTFS frame.

20. The method of claim 15, further comprising:

receiving, from the transmitting device, an indication of a tone reservation pattern and a quantity of resources associated with the OTFS tone reservation signal.

21. The method of claim 20, wherein the indication of the tone reservation pattern and the quantity of resources associated with the OTFS tone reservation signal is provided via one or more of a control signaling communication, a radio resource control (RRC) communication, a medium access control (MAC) control element, or any combinations thereof.

22. The method of claim 20, wherein the indication of the tone reservation pattern and the quantity of resources associated with the OTFS tone reservation signal includes an index value of a plurality of index values that are mapped to different tone reservation patterns and quantities of resources.

23. An apparatus for wireless communication at a transmitting device, comprising:

one or more processors;

one or more memories coupled with the one or more processors; and instructions stored in the memory and executable by the one or more processors to cause the apparatus to:

generate an orthogonal time-frequency space (OTFS) tone reservation signal for transmission via a first subset of resources of a plurality of resources of an OTFS frame, the plurality of resources spanning a delay-Doppler resource grid associated with the OTFS frame for communications between the transmitting device and a receiving device;

generate an information signal for transmission via a second subset of resources of the plurality of resources for the OTFS frame, the information signal including information bits modulated according to an OTFS waveform; and transmit, to the receiving device, the OTFS tone reservation signal via the first subset of resources and the information signal via the second subset of resources.

24. The apparatus of claim 23, wherein the first subset of resources comprise a first subset of delay-Doppler symbols in the delay-Doppler resource grid.

25. The apparatus of claim 23, wherein the instructions to generate the OTFS tone reservation signal are executable by the one or more processors to cause the apparatus to:

select a plurality of delay-Doppler symbols in the delay-Doppler resource grid as tone reservation symbols, wherein the tone reservation symbols in the delay-Doppler resource grid are transformed into time resources and frequency resources for transmission to the receiving device.

26. The apparatus of claim 23, wherein the first subset of resources are out-of-frame resources that occupy one or more resources outside of the OTFS frame.

27. The apparatus of claim 23, wherein the instructions to generate the OTFS tone reservation signal are executable by the one or more processors to cause the apparatus to:

determine a tone reservation pattern and a quantity of resources associated with the OTFS tone reservation signal based at least in part on one or more channel measurements of a channel between the transmitting device and the receiving device; and transmit an indication of the tone reservation pattern and the quantity of resources associated with the OTFS tone reservation signal to the receiving device.

28. An apparatus for wireless communication at a receiving device, comprising:

one or more processors;

one or more memories coupled with the one or more processors; and instructions stored in the memory and executable by the one or more processors to cause the apparatus to:

receive, from a transmitting device, an orthogonal time-frequency space (OTFS) frame via a set of resources that span a delay-Doppler resource grid associated with the OTFS frame, wherein a first subset of the set of resources provide an OTFS tone reservation signal and a second subset of resources of the set of resources provide an information signal including information bits modulated according to an OTFS waveform; and decode the information signal from the second subset of resources based at least in part on the second subset of resources and the OTFS waveform.

29. The apparatus of claim 28, wherein the instructions to decode the information signal are executable by the processor to cause the apparatus to:

transform a first set of received orthogonal frequency division multiplexing (OFDM) modulation symbols in a time-frequency resource grid into a second set of delay-Doppler symbols in the delay-Doppler resource grid;

determine a subset of delay-Doppler symbols of the second set of delay-Doppler symbols that are tone reservation symbols;

discard the tone reservation symbols from the second set of delay-Doppler symbols to obtain a set of information symbols; and decode the set of information symbols based at least in part on the OTFS waveform.

30. The apparatus of claim 28, wherein the instructions are further executable by the processor to cause the apparatus to:

receive, from the transmitting device, an indication of a tone reservation pattern and a quantity of resources associated with the OTFS tone reservation signal.

* * * * *